(12) United States Patent
Gendler et al.

(10) Patent No.: US 9,710,041 B2
(45) Date of Patent: Jul. 18, 2017

(54) MASKING A POWER STATE OF A CORE OF A PROCESSOR

(71) Applicant: Intel Corporation, Santa Clara, CA (US)

(72) Inventors: Alexander Gendler, Kiriat Motzkin (IL); Larisa Novakovsky, Haifa (IL); Krishnakanth V. Sistla, Beaverton, OR (US); Vivek Garg, Folsom, CA (US); Dean Mulla, Saratoga, CA (US); Ashish V. Choubal, Austin, TX (US); Erik G. Hallnor, Beaverton, OR (US); Kimberly C. Weier, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 14/812,056

(22) Filed: Jul. 29, 2015

(65) Prior Publication Data

US 2017/0031412 A1    Feb. 2, 2017

(51) Int. Cl.

| G06F 1/26 | (2006.01) |
|---|---|
| G06F 1/32 | (2006.01) |
| G06F 1/04 | (2006.01) |
| G06F 9/38 | (2006.01) |
| G06F 15/17 | (2006.01) |

(52) U.S. Cl.
CPC ............. *G06F 1/3203* (2013.01); *G06F 1/04* (2013.01); *G06F 1/324* (2013.01); *G06F 1/329* (2013.01); *G06F 1/3237* (2013.01); *G06F 1/3243* (2013.01); *G06F 1/3293* (2013.01); *G06F 9/38* (2013.01); *G06F 1/26* (2013.01); *G06F 1/263* (2013.01); *G06F 15/17* (2013.01)

(58) Field of Classification Search
CPC ...... G06F 1/3203; G06F 1/324; G06F 1/3293; G06F 1/3287; G06F 15/17; G06F 1/26; G06F 1/13; G06F 1/263
USPC ................................ 713/300, 320, 323, 330
See application file for complete search history.

(56) References Cited

U.S. PATENT DOCUMENTS

| 5,163,153 A | 11/1992 | Cole et al. |
|---|---|---|
| 5,522,087 A | 5/1996 | Hsiang |
| 5,590,341 A | 12/1996 | Matter |
| 5,621,250 A | 4/1997 | Kim |

(Continued)

FOREIGN PATENT DOCUMENTS

EP     1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Michael J Brown
(74) *Attorney, Agent, or Firm* — Trop, Pruner & Hu, P.C.

(57) ABSTRACT

In one embodiment, a processor includes a core to execute instructions and a core perimeter logic coupled to the core. The core perimeter logic may include a fabric interface logic coupled to the core. In turn, the fabric interface logic may include a first storage to store state information of the core when the core is in a low power state, and enable an inter-die interconnect coupled between the core and an uncore to be maintained in an active state during entry of the core into a low power state. Other embodiments are described and claimed.

21 Claims, 20 Drawing Sheets

(56) References Cited

U.S. PATENT DOCUMENTS

| | | |
|---|---|---|
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 9,069,555 B2 | 6/2015 | Fetzer et al. |
| 9,317,360 B2 * | 4/2016 | Vargas ............... G06F 11/1004 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0249094 A1 | 10/2009 | Marshall et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2010/0205503 A1* | 8/2010 | Dahlen ............... G06F 1/3203 714/749 |
| 2011/0154090 A1 | 6/2011 | Dixon et al. |
| 2012/0079290 A1 | 3/2012 | Kumar |
| 2012/0246506 A1 | 9/2012 | Knight |
| 2013/0007494 A1 | 1/2013 | Branover et al. |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0068290 A1 | 3/2014 | Bhandaru et al. |
| 2014/0195829 A1 | 7/2014 | Bhandaru et al. |
| 2014/0208141 A1 | 7/2014 | Bhandaru et al. |
| 2015/0058650 A1 | 2/2015 | Varma et al. |
| 2015/0169036 A1 | 6/2015 | Sodhi et al. |
| 2016/0116970 A1* | 4/2016 | Beck ............... G06F 1/3287 713/323 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benin!, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra, Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

U.S. Appl. No. 14/609,835, filed Jan. 30, 2015, entitled "Communicating Via a Mailbox Interface of a Processor," by Alexander Gendler, et al.

U.S. Appl. No. 14/609,886, filed Jan. 30, 2015, entitled "Performing Context Save and Restore Operations in a Processor," by Alexander Gendler, et al.

U.S. Appl. No. 14/497,549, filed Sep. 26, 2014, entitled "Apparatus and Method to Transfer Data Packets between Domains of a Processor," by Shani Rehana, et al.

International Searching Authority, "Notification of Transmittal of the International Search Report and the Written Opinion of the International Searching Authority," mailed Aug. 24, 2016 in International application No. PCT/US2016/037347.

* cited by examiner

MASKING A POWER STATE OF A CORE OF A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

In various embodiments, a power state of a core or other intellectual property (IP) logic block of a processor or other system on chip (SoC) can remain hidden from other assets of the processor, including a fabric and other IP blocks. More specifically, embodiments provide a core perimeter logic, which is peripheral logic associated with a core that acts as an interface between the core and other processor components, including one or more fabrics and other IP blocks.

By hiding or maintaining transparent to a remainder of a processor the true power state of the core, communications to the core may continue even when the core is in a low power state. This core perimeter logic may be configured to handle or at least appear to the other logic that it is handling the incoming traffic so that the core can remain in a low power state (and possibly a deeper low power state) for longer time periods. Still further, by providing this transparency of power state to other processor components, greatly reduced entry and exit flows into and out of a given low power state may occur, reducing latency for low power state transitions. In addition, by reducing the flows and maintaining power state of a core invisible to other components, the need for such other components to be drained of transactions during power management entry and exit flows is avoided, greatly reducing impact of low power state entry and exit on processor performance.

Figure 1:
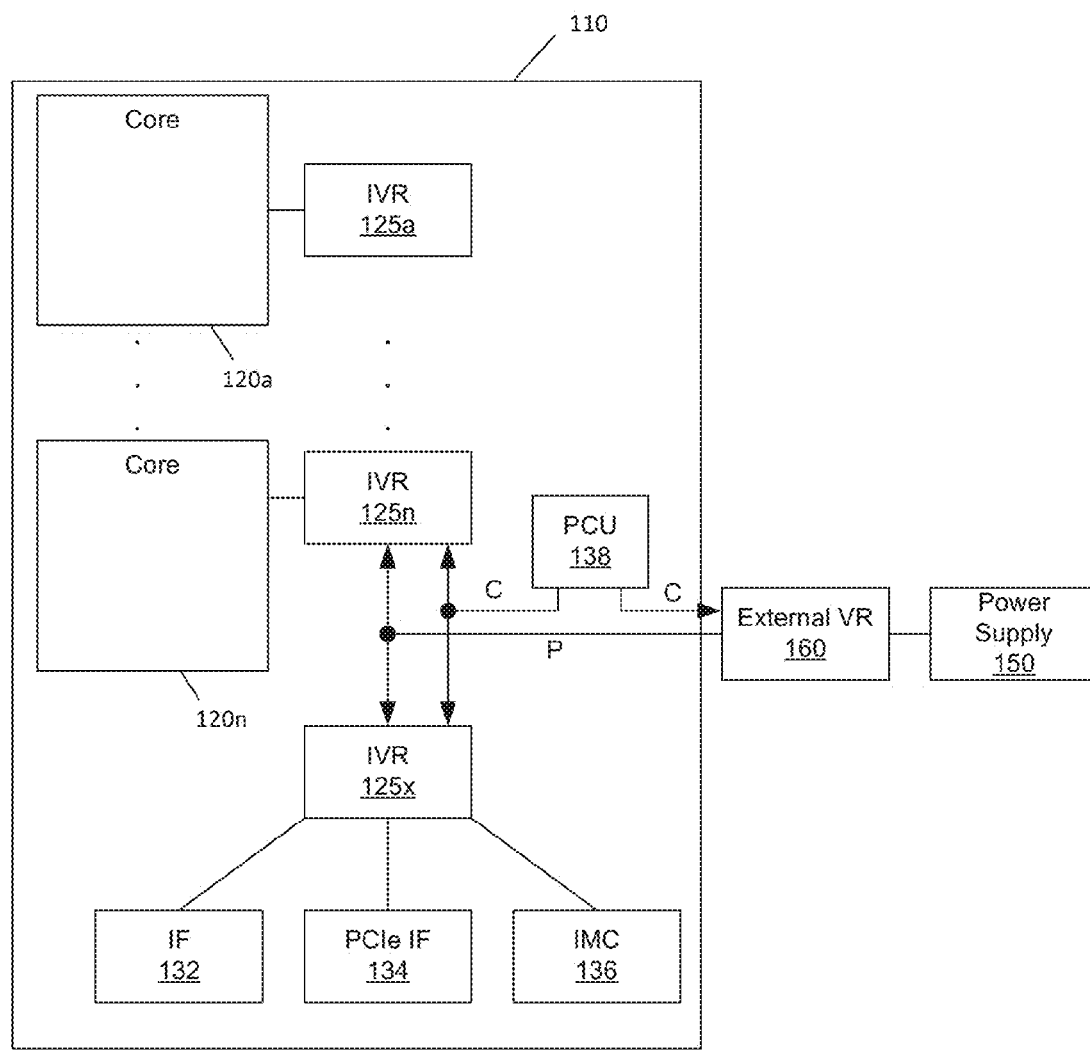
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
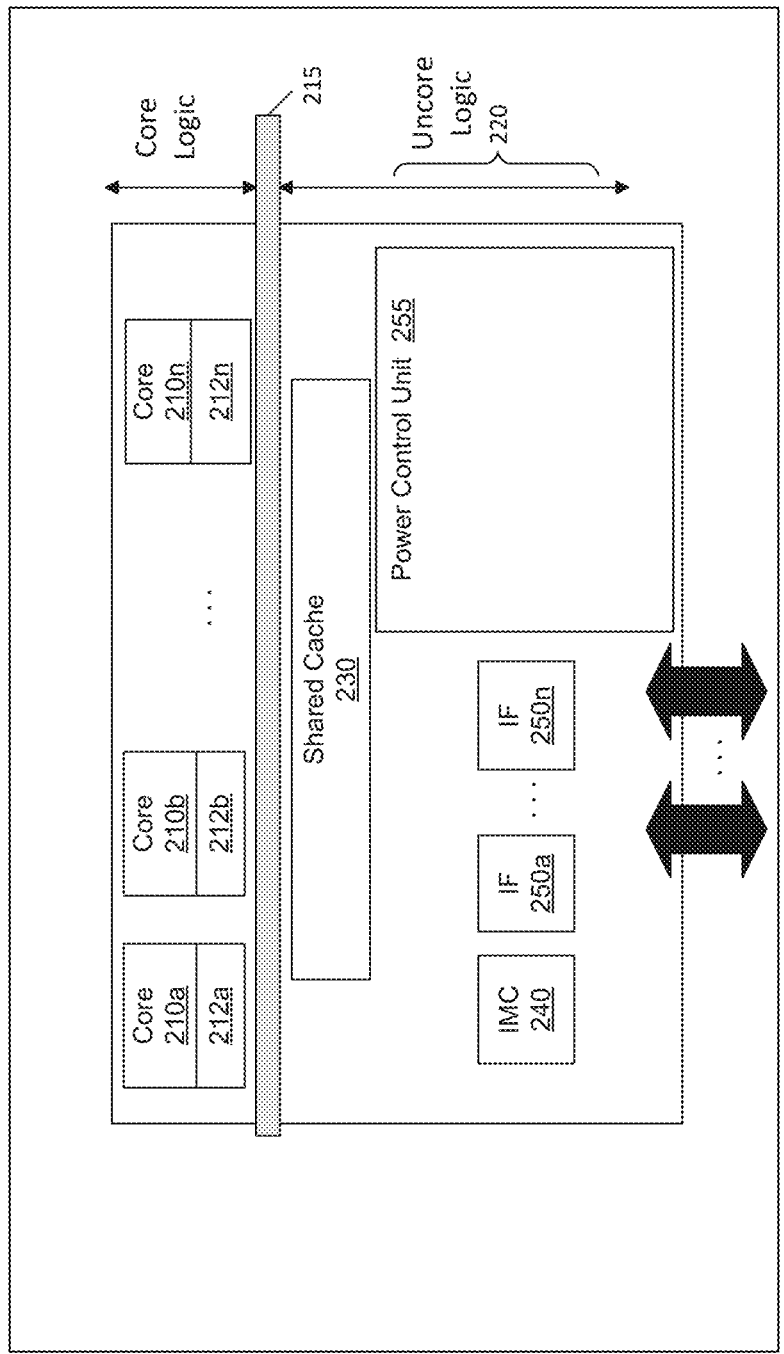
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. Each core 210 may be associated with a corresponding core perimeter logic 212a-212n. In general, core perimeter logic 212 may include one or more independent power/frequency domains that provide an interface between core circuitry and a remainder of the processor. In addition, each core perimeter logic 212 may be configured with multiple constituent logic units to perform various operations on behalf of a corresponding core when it is in a given low power state, to allow a power state of the core to be hidden from a remainder of the processor. In addition, one or more independent storage units of each core perimeter logic 212 may be adapted to store at least certain context information of the associated core to enable fast entry into and exit from particular low power states and to further enable certain processor operations (such as interrupt handling, snoop responses, credit handling, and so forth) to occur while a corresponding core is in a low power state.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. In some cases, in addition to direct connections between given cores 210 and uncore 220, core perimeter logics 212 also may be directly coupled to at least portions of uncore 220.

In addition, by interfaces $250a$-$250n$, connection can be made to various off-chip components such as peripheral devices, mass storage and so forth. While shown with this particular implementation in the embodiment of FIG. 2, the scope of the present invention is not limited in this regard.

Figure 3:
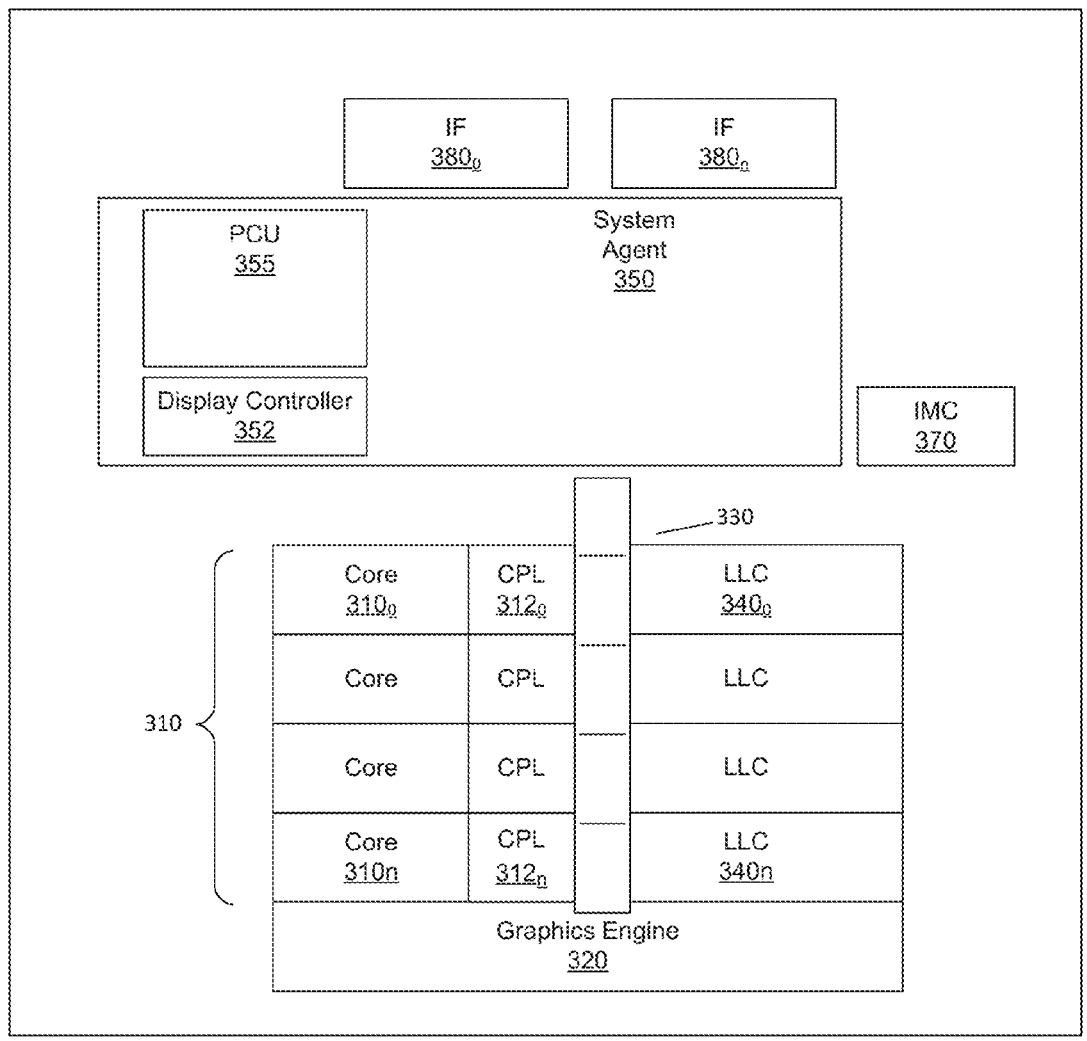
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain. As further shown, a plurality of core perimeter logics $312_0$-$312_n$ each may be associated with a given core and may enable a power state of the corresponding core to be maintained hidden from other processor agents, in addition to providing for efficient storage and retrieval of context information, e.g., as used during low power entry and exit situations. In the illustration of FIG. 3, core perimeter logic 312 is shown coupled between a corresponding core 310 and ring interconnect 330. However understand that direct connection between core 310 and ring interconnect 330 may be present, along with corresponding direct connection between core perimeter logic 312 and ring interconnect 330, in some embodiments.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
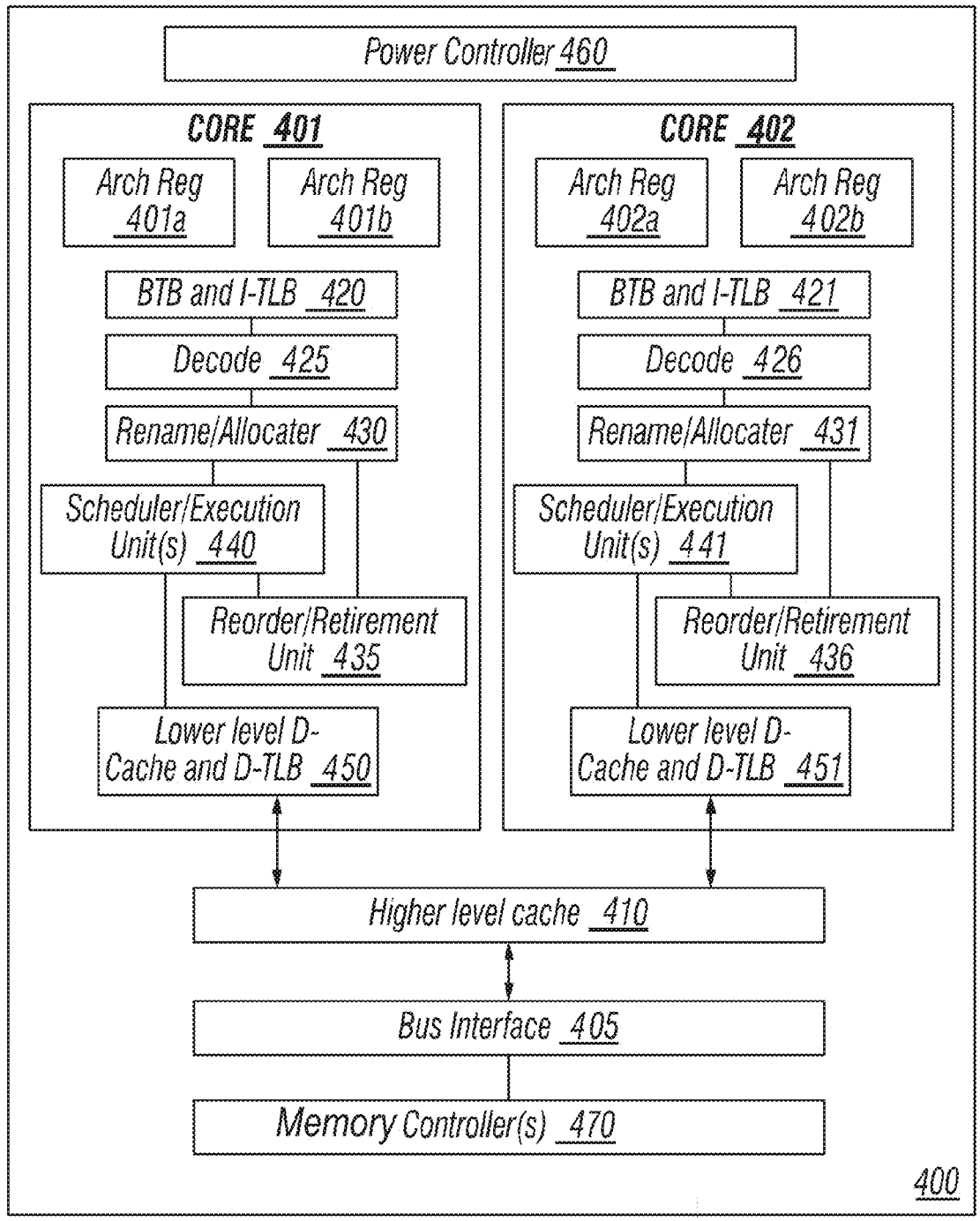
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
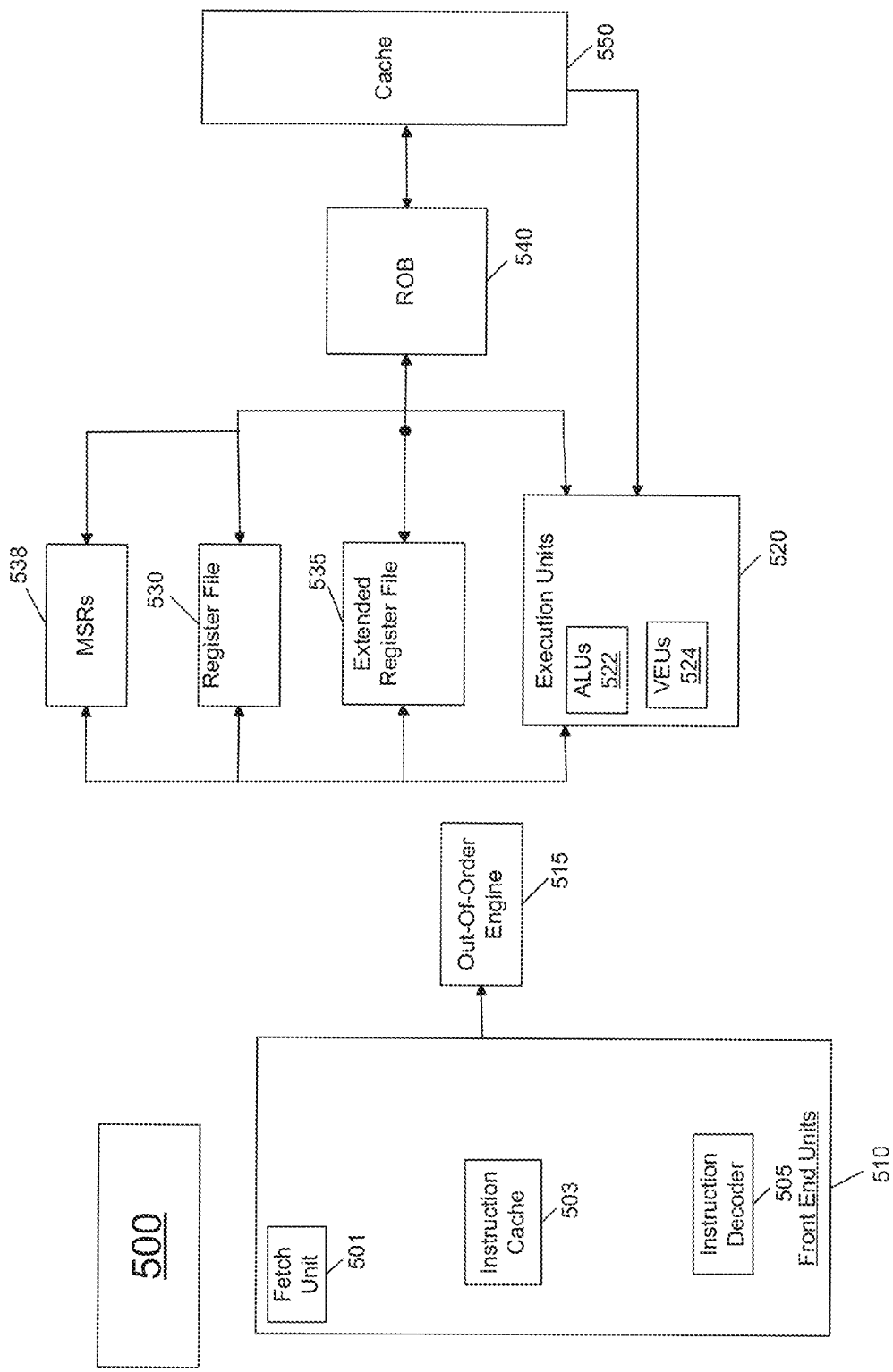
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
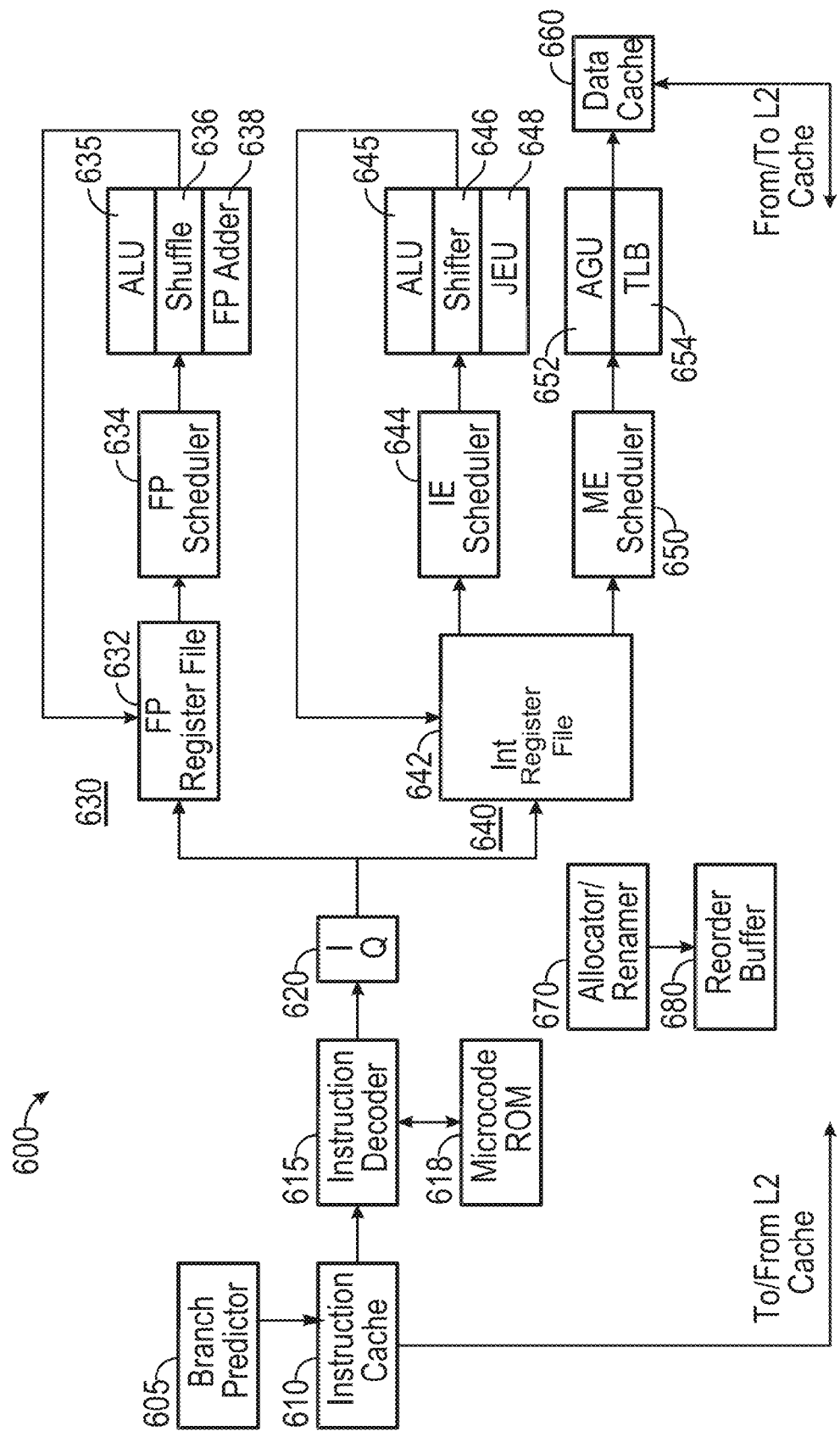
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
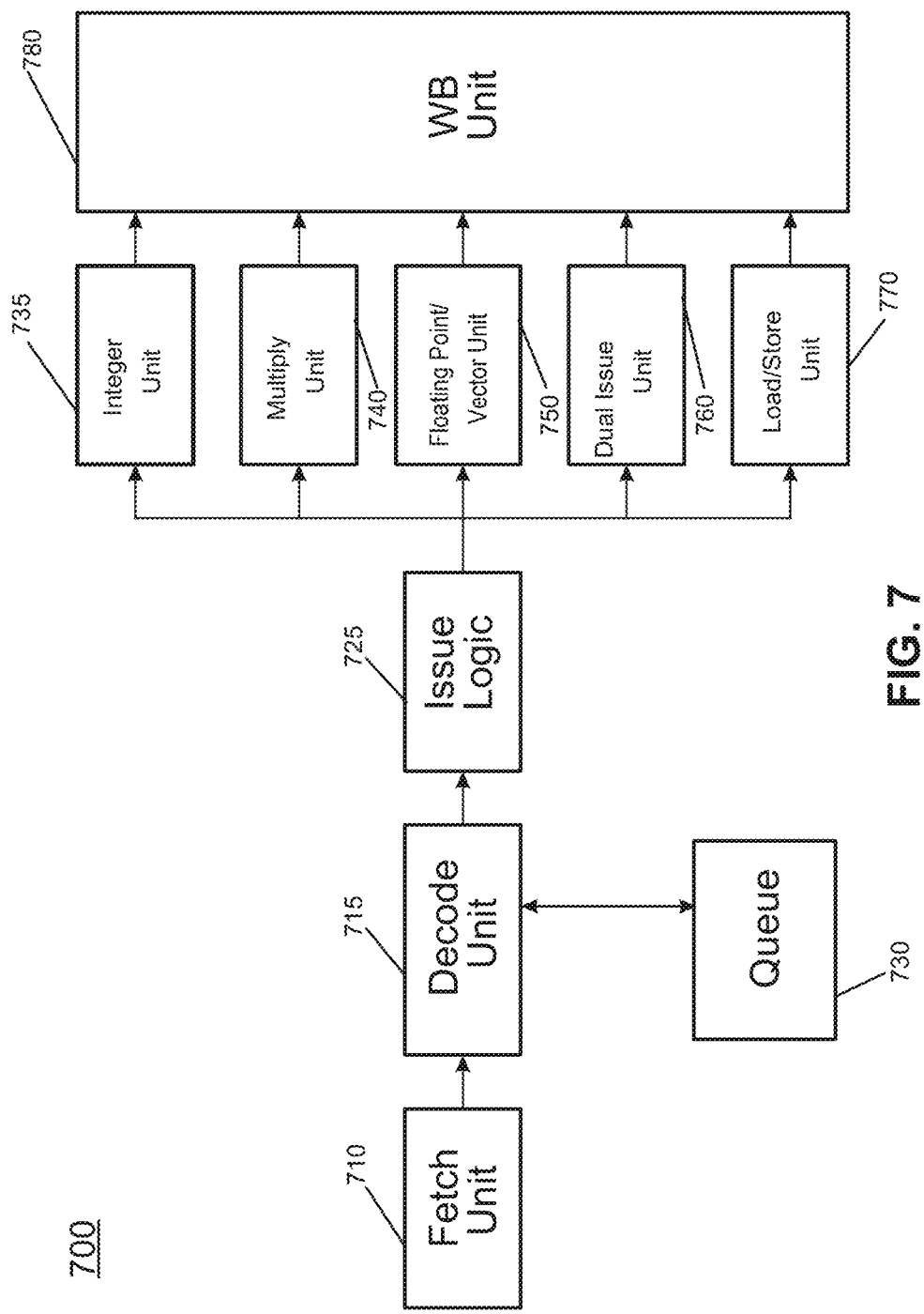
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
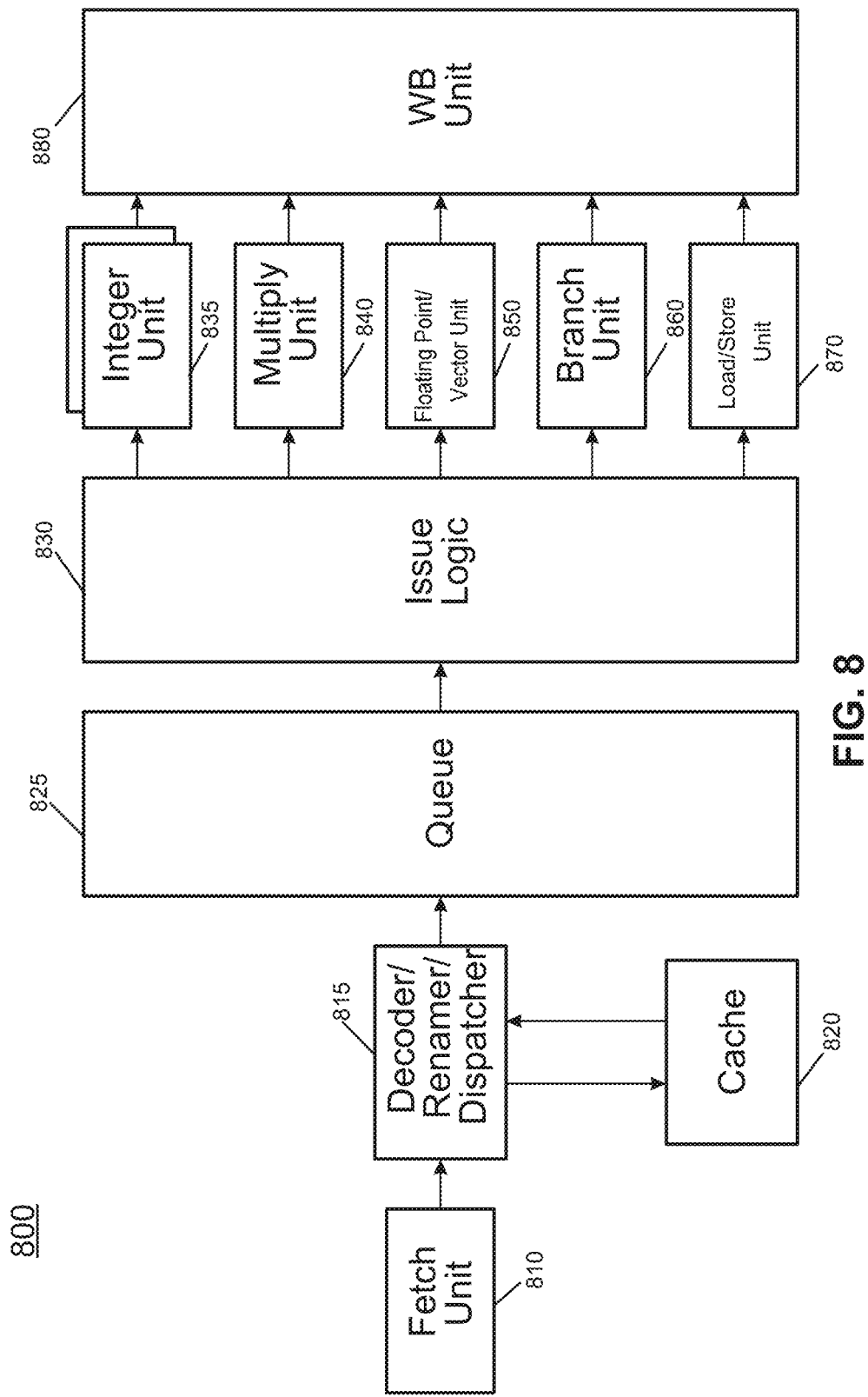
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
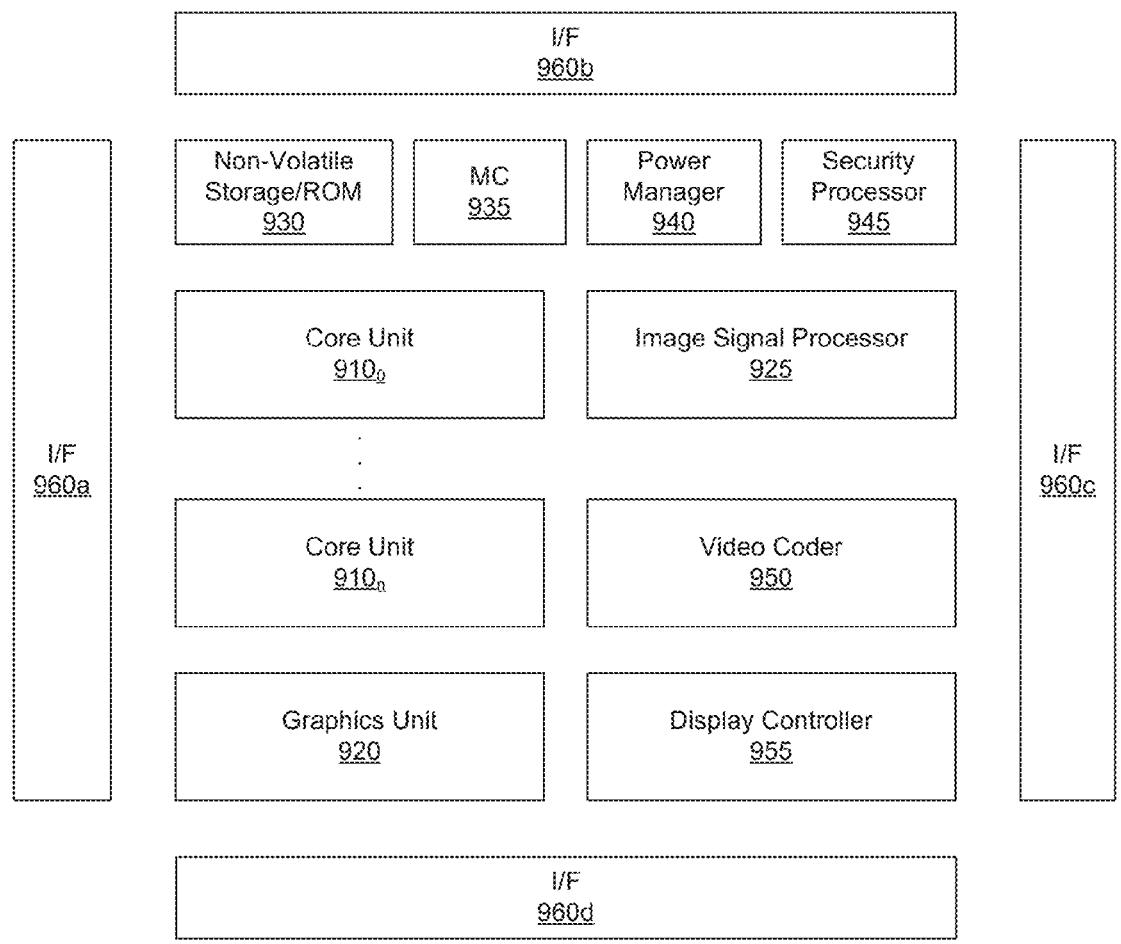
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. As also described herein, each core unit 910 may include a corresponding core perimeter logic (not specifically shown in FIG. 9), to enable a power state of the core to remain transparent to a remainder of the processor, and to allow enhanced communications and provide for efficient entry into and exit from low power states, among other functions. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
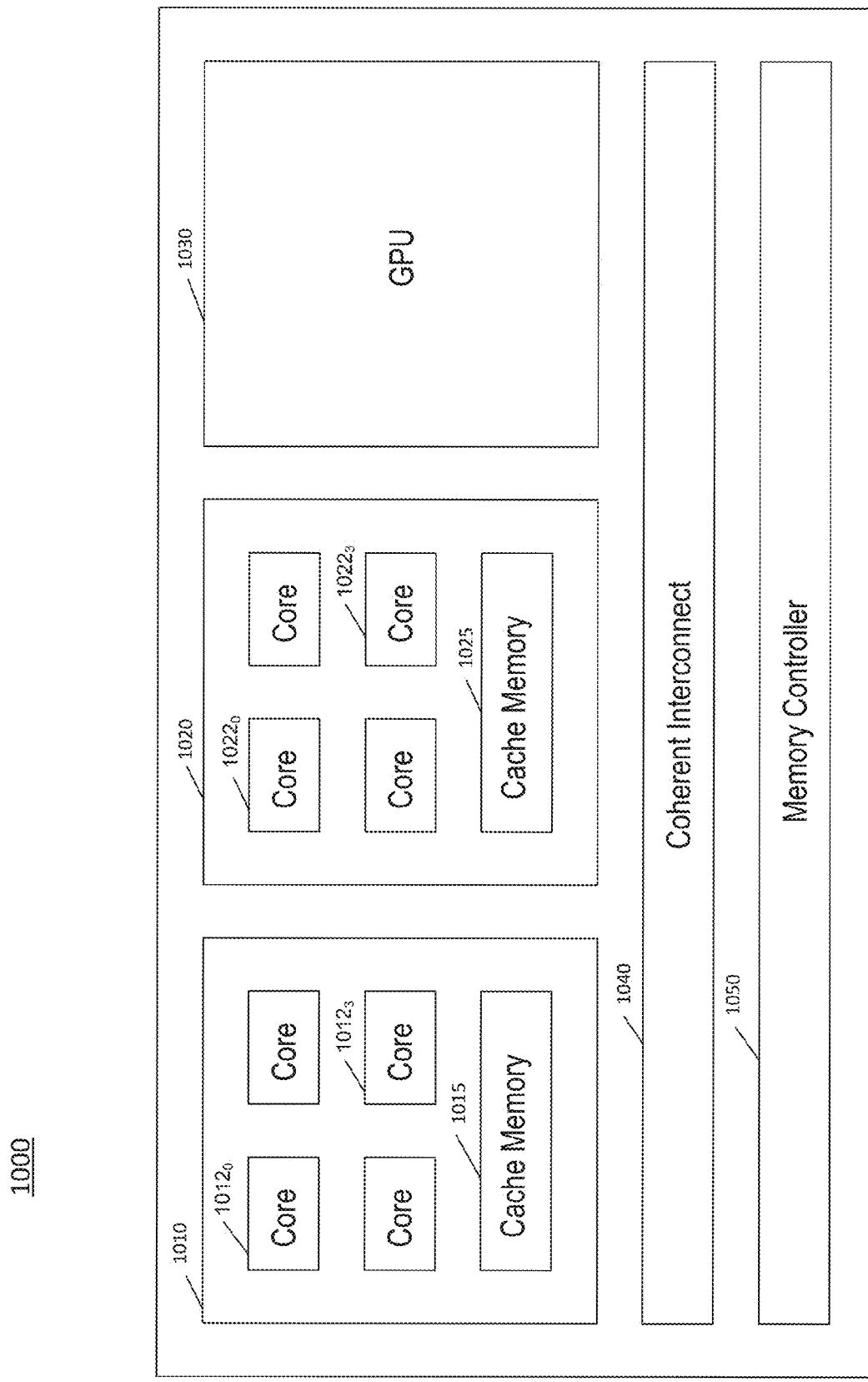
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores that may interface with corresponding core perimeter logic that enables a power state of the core to appear to be active when in fact the core is in a given low power state, as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
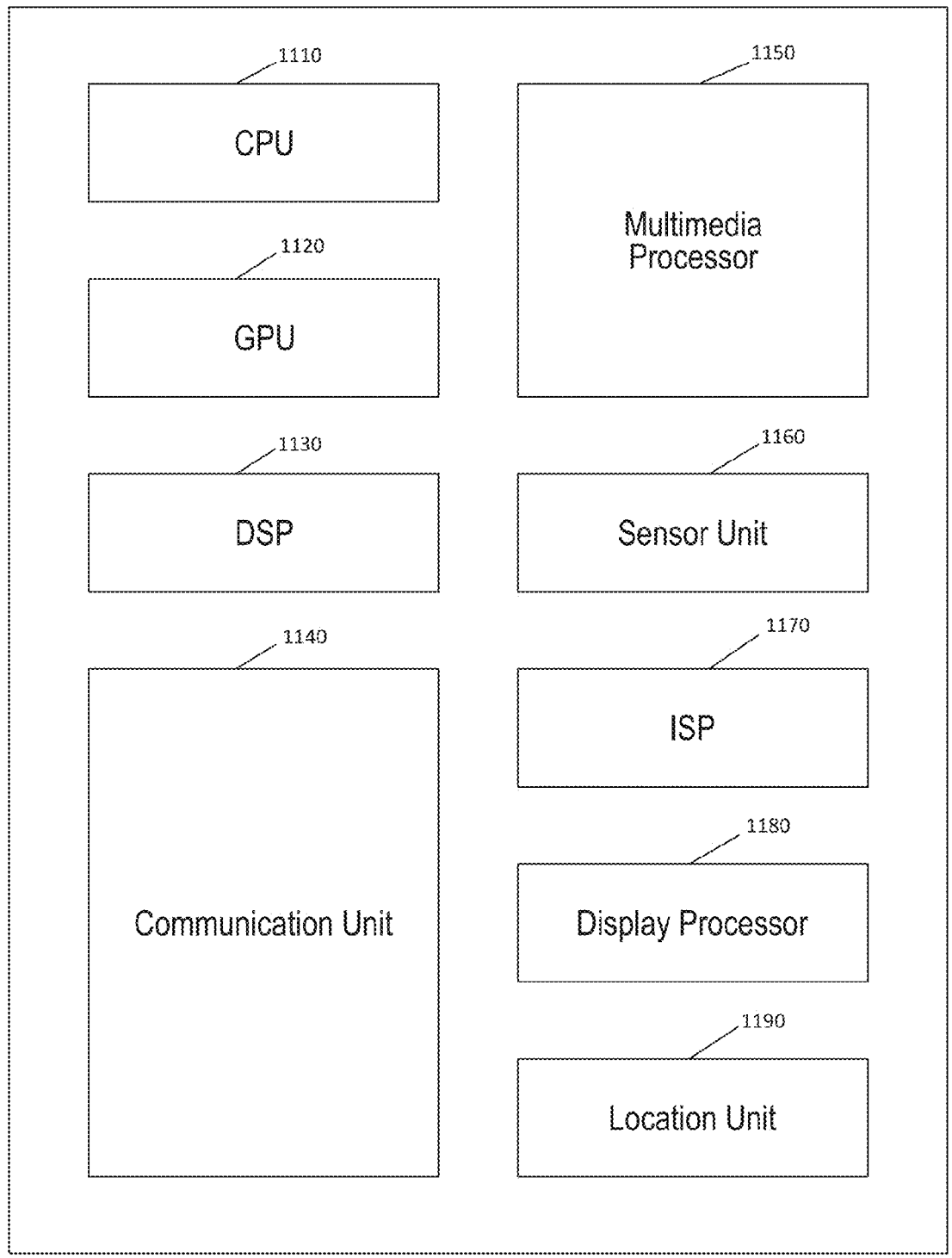
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
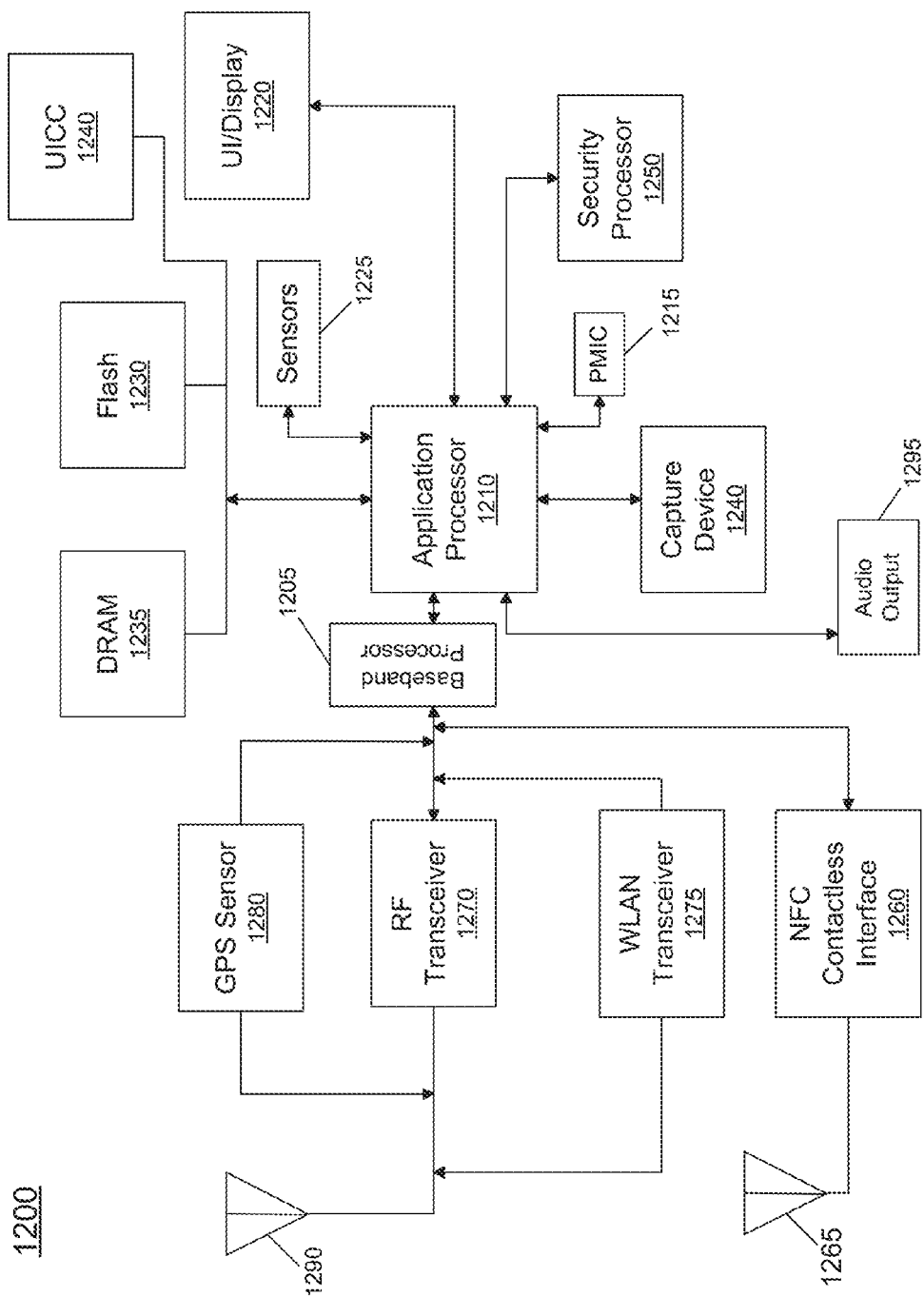
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
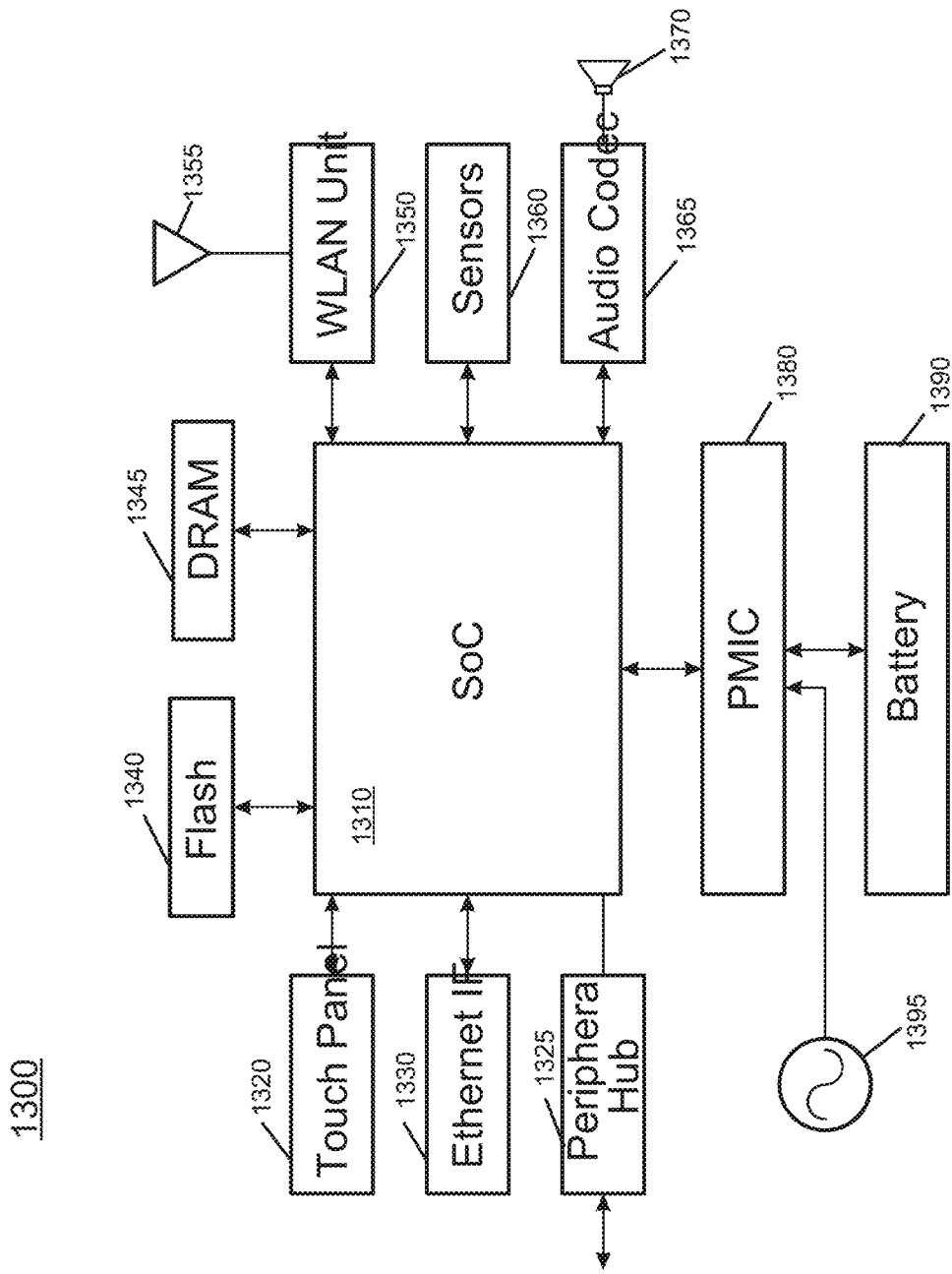
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
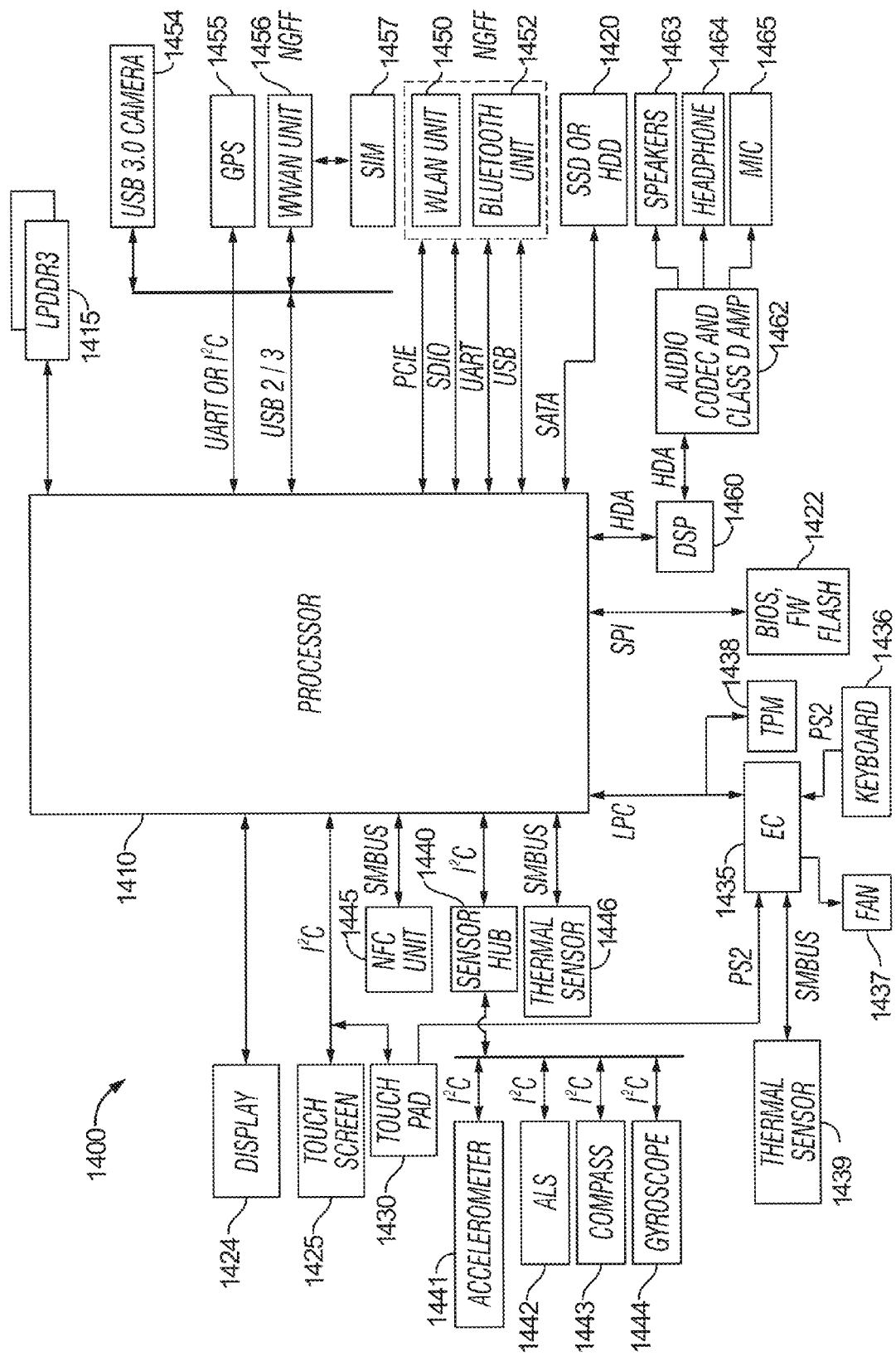
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, WiFi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
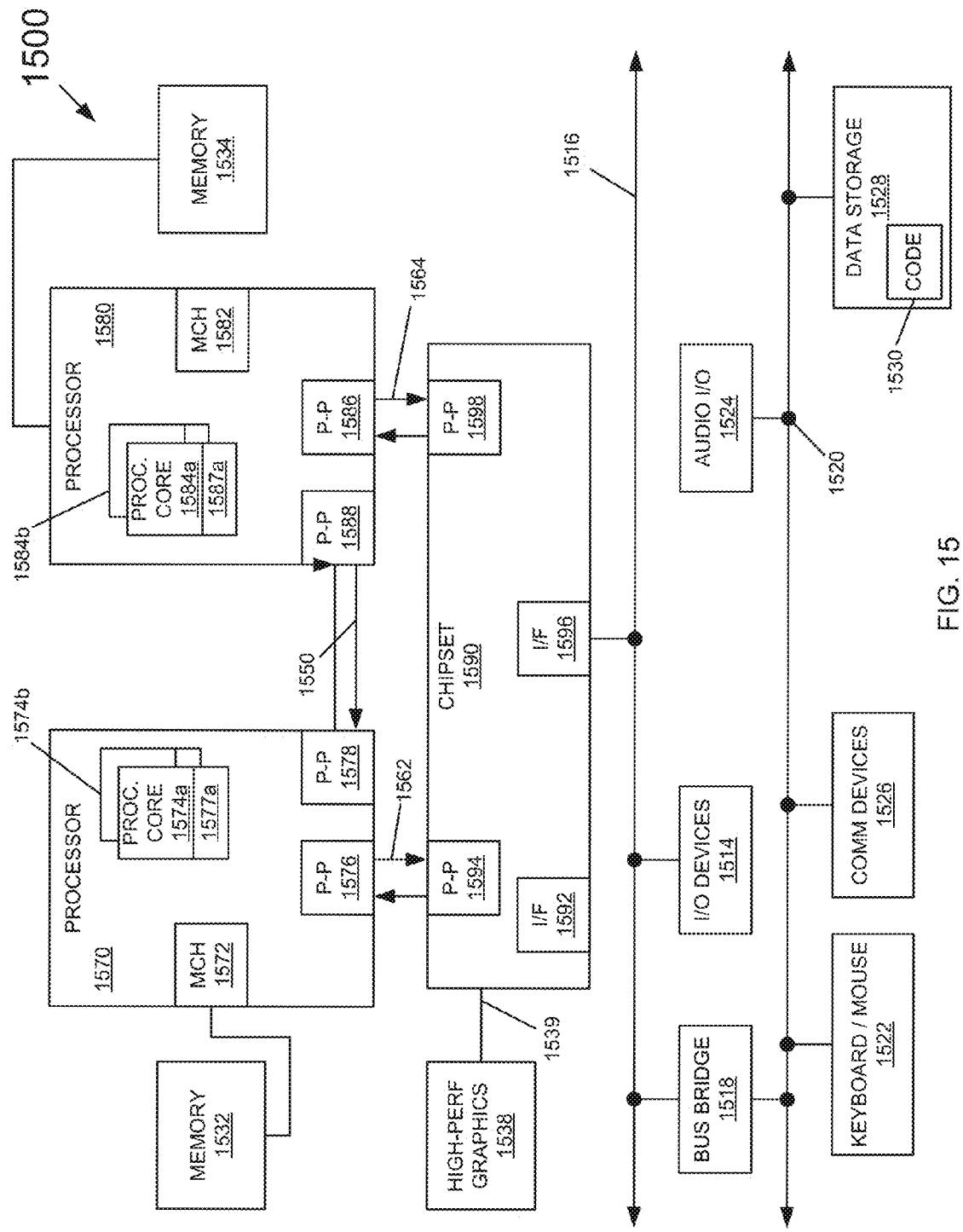
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Such processor cores may couple to corresponding core perimeter logics 1577a and 1577b and core perimeter logics 1587a and 1587b to provide transparency with regard to the power state of the corresponding processor core, and enable efficient communication of context and other information, both for purposes of low power state entry and exit as well as for communication of information during normal operation. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
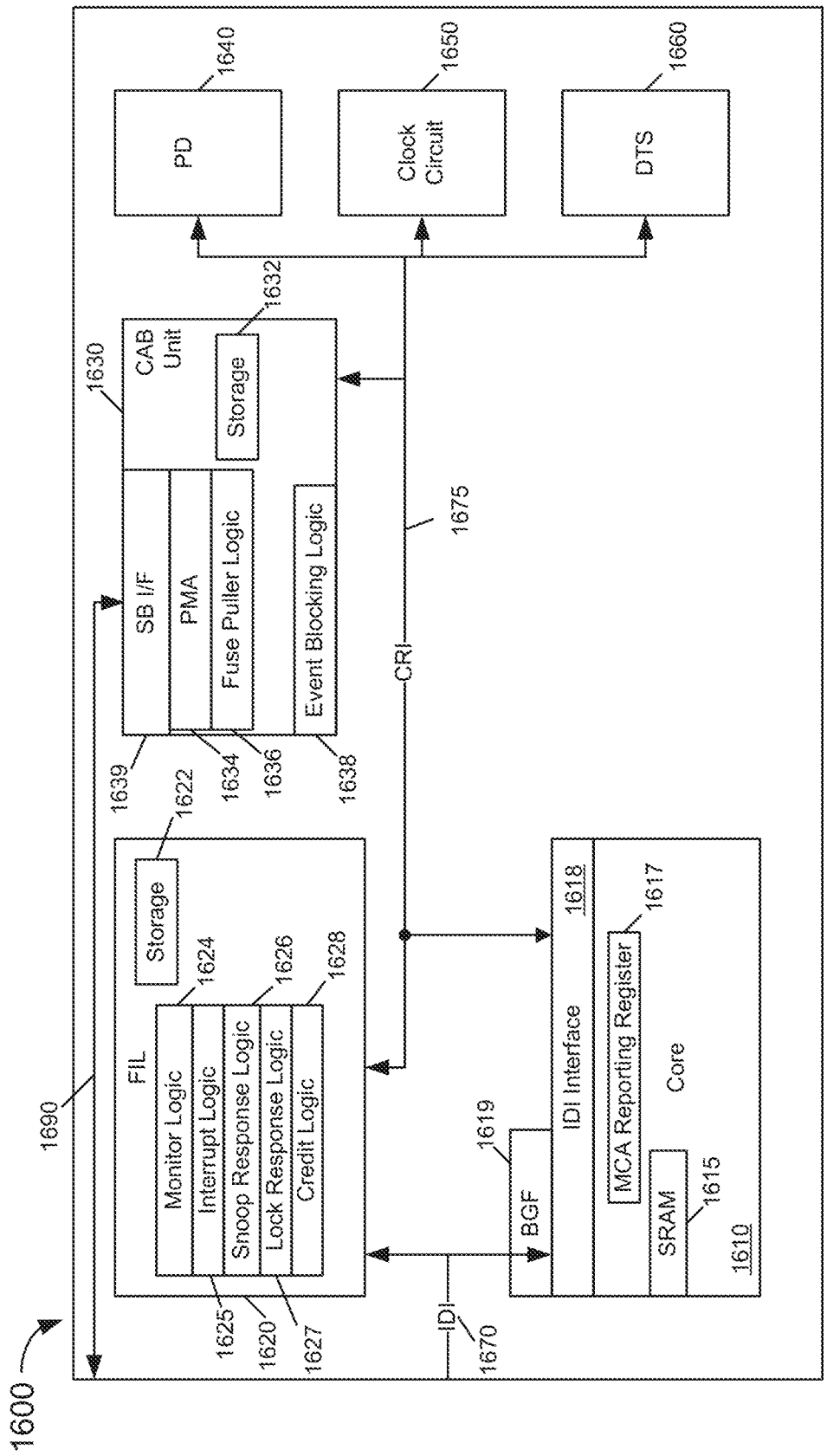
FIG. 16 is a block diagram of a processor in accordance with an embodiment of the present invention.

Referring now to FIG. 16, shown is a block diagram of a processor in accordance with an embodiment of the present invention. As shown in FIG. 16, processor 1600 includes a core 1610 and various core perimeter logic. Understand that for ease of illustration only a single core 1610 is shown. However, in many embodiments a multicore processor includes a plurality of cores, each with its own core perimeter logic. In the high level shown in FIG. 16, the components of processor 1600 all may be implemented on a single semiconductor die. As seen, core 1610 includes a storage 1615, which in an embodiment may be a static random access memory (SRAM) in which various context or state information of the core is stored. Note that the terms "state information" and "context information" are used interchangeably herein, and refer to information such as control register values, data information, register-stored information, and other information associated with a thread being executed on a core or other logic. Such information can be saved when the corresponding thread is switched from the core, e.g., due to entry into a low power state or migration to another core.

In an embodiment, storage 1615 may be configured to remain powered on while the core is in certain low power states. As an example, storage 1615 may maintain information while a core is in a given low power state (e.g., C6) and the processor package is in a package active state (C0). However, in other low power states, such power may not be available, and the context information may be sent to other storages as described herein. As will be described herein, given that errors may occur in SRAM 1615 when exiting from a C6 state and before certain machine check architecture (MCA) logic is available, MCA reporting register 1617 may be provided to log an uncorrectable error situation occurring in SRAM 1615.

Core 1610 further includes an intra-die interconnect (IDI) interface 1618 to interface with an IDI 1670. Although not shown for ease of illustration, understand that IDI 1670 may couple core 1610 with various other circuitry within the processor (not shown for ease of illustration in FIG. 16), including one or more other cores, a peripheral controller hub (PCH), one or more cache memories and/or other uncore circuitry. To provide for an interface between core 1610 and other components within the processor that may operate at different frequencies, a clock crossing logic 1619 may be provided, which in an embodiment may be implemented as a bubble generator first in first out (FIFO) buffer. Details of this clock crossing logic, which may provide for back pressure control, are described further below.

To enable core 1610 to enter into particular and deeper low power states when available, a first core perimeter logic, namely a fabric interface logic (FIL) 1620, is coupled to core 1610. FIL 1620 may be of a first sustain power domain, in that it is provided with power and clock signals when at least portions of the processor are in a low power state. As seen, FIL 1620 couples to core 1610 via both IDI 1670 and a second interconnect 1675, which in an embodiment is a control register interconnect (CRi). Interconnect 1675 may be a relatively simple and low performance interconnect to provide for communication of state information during save and restore operations for low power state entry and exit.

In the embodiment shown in FIG. 16, FIL 1620 includes a storage 1622, which may be implemented as a plurality of registers configured to store the state information received from core 1610 prior to the core's entry into a given low power state. Power may be maintained to FIL 1620 until the processor package enters a deeper package low power state (e.g., a package C6 state) when a coherent fabric enters a low power state. As further shown, FIL 1620 includes a monitor logic 1624, an interrupt control logic 1625, and a snoop response logic 1626. In general, monitor logic 1624 may be configured, when core 1610 is in a low power state, to monitor one or more monitored locations for an update to a value stored therein. Upon such update, FIL 1620 may communicate a wakeup request to core 1610. In an embodiment, monitor logic 1624 may thus be configured to implement MONITOR/MWAIT operations while core 1610 is in a low power state. In turn, interrupt control logic 1625 may be configured to handle incoming interrupts while core 1610 is in a low power state. Such handling may include delaying the interrupt and/or sending a response to the interrupt. Still further, in some cases the handling may include causing core 1610 to wake up to handle the interrupt.

Also, FIL 1620 includes snoop response logic 1626, which may be configured to send a snoop response responsive to receipt of a snoop request that is incoming while core 1610 is in a low power state. That is, because there is no corresponding cache line present for a snoop request when the core is in a low power state, snoop response logic 1626 thus may send a response to indicate that core 1610 does not include a copy of a cache line associated with the snoop request. Details regarding snoop response logic 1626 are described further below.

As further shown in FIG. 16, FIL 1620 also includes a lock response logic 1627. In general, lock response logic 1627 may be configured to handle lock flows that occur when core 1610 is in a given low power state (e.g., a C6 or deeper low power state). More specifically, a lock quiesce message may be received from an uncore or other SoC location while core 1610 is in a C6 or deeper low power state. Such a lock quiesce message may be received when a given IP block of the SoC seeks to perform an atomic operation such as a read modify write (RMW) flow. Typically, in such RMW flow, all other IP blocks are blocked from sending any transactions for the duration of the atomic operation and further are to acknowledge that the IP block does not have any in-flight transactions. As such, responsive to receipt of a lock quiesce message, the other IP blocks, if these conditions are met, send an acknowledgement message to indicate that the IP block does not have any in-flight transactions and will not send any transactions during the atomic flow. When valid acknowledgments are received from all relevant IP blocks, the requesting IP block is allowed to perform the atomic operation.

However, when a given core is in a deep low power state, it is not able to respond to an incoming lock quiesce message. In this situation, lock response logic 1627 may generate a default response to this message. More specifically, logic 1627 may be configured to provide a default response to indicate or acknowledge that the core has received this message and will not send any transactions. Still further, lock response logic 1627 may receive a lock release message at the conclusion of the atomic operation and handle that message.

Note that in cases where core 1610 wakes in the middle of an atomic operation, lock response logic 1627 may communicate the presence of such active atomic flow to the core to prevent the core from sending any transactions until a lock release is received. As such, lock response 1627 is configured to handle responsibility for incoming lock messages while the core is in a low power state and pass responsibility for proper respect of an ongoing atomic operation should the core wake during the operation.

As further shown, FIL 1620 also includes a credit logic 1628. More specifically, credit logic 1628 may be used to perform credit management activities while core 1610 is in a particular low power state, e.g., a C6 or deeper low power state. In an embodiment, credit logic 1628 may be configured to handle credit exchanges while the core is in such low power state. As an example, when credits are returned on a path to core 1610 but core 1610 is in such low power state, credit logic 1628 may accommodate the credit updates by providing a set of shadow credit registers or other storages to maintain and update credit values associated with various information channels. In one embodiment, credit counters may be present for various channels, including separate counters for each of request, response, and data in both incoming and outgoing directions. Then when core 1610 enters into an active state, a credit update process may occur between credit logic 1628 and core 1610 such that the corresponding credit logic of the core (e.g., including a set of credit counters each associated with a particular information channel) may be updated as appropriate. Note that at the point the core enters an active state and receives updates to various credit values, the core also takes responsibility for credit activities.

Still referring to FIG. 16, an additional core perimeter logic is a chassis adapter block (CAB) unit 1630. In general, CAB unit 1630 may be configured to provide an interface to other processor and system components via a sideband interconnect 1690. Still further, CAB unit 1630 may be configured to store state information of core 1610 when FIL 1620 itself is placed into a low power state. CAB unit 1630 may be of a second sustain power domain, in that it is provided with power and clock signals when other portions of processor 1600 (including FIL 1620) are in a low power state. CAB unit 1630 includes a storage 1632 that may be configured to store the state information obtained from FIL 1620. In an embodiment, storage 1632 of CAB unit 1630 may be a fast storage array, e.g., implemented as a SRAM.

In the embodiment shown, CAB unit 1630 includes a power management agent (PMA) 1634, a fuse puller logic 1636 that may include one or more finite state machines (FSMs) to perform save and restore operations, both with regard to storage 1622 and more distant portions of a memory hierarchy (e.g., a system memory) when CAB unit 1630 itself is to be placed into a low power state. For example, the information stored in storage 1622 may be flushed to system memory when the processor package enters a still deeper package low power state (e.g., a package C10 state). In an embodiment, these FSMs may be SoC-based FSMs as they enable interaction between core perimeter logic and other portions of an SoC (and onto further portions of a memory hierarchy). Note that PMA 1634 may be a portion of power management logic of a processor that may be active when CAB unit 1630 is powered on. In some cases, PMA 1634 may interface with a main power controller of a processor such as a PCU or other power management entity.

CAB unit 1630 further includes an event blocking logic 1638, which may be configured to block incoming events when the processor is in particular low power states. Still further, CAB unit 1630 also includes a sideband interface 1639, which may interface with sideband interconnect 1690. Note that in various embodiments, IDI 1670 is a wide, high-speed interconnect to accommodate primary (and often performance critical) communications between various cores and other IP blocks of an SoC at high speeds. Instead, sideband interconnect 1690 may be configured for less performance critical communications, via use of a narrower channel and lower operating frequency.

In an embodiment, event blocking logic 1638 may block incoming sideband events when the core is in a C6 or other deep low power state. In general, logic 1638 may store such incoming events, e.g., low performance interrupts or other events. Upon receipt of these incoming events, event blocking logic 1638 may signal PMA 1634 to enable the PMA to determine whether to wake core 1610 to handle the incoming events. Upon waking of core 1610, any stored events can be pushed from event block logic 1638 to core 1610.

In an embodiment, storage 1632 of CAB unit 1630 may be allowed to be accessed by PMA 1634 or by a verified access received via sideband interface 1639. In one such embodiment, this interface may include a security attribute identifier (SAI) logic to determine whether an access request to storage 1632 has a valid SAI security protection (e.g., a SAI value received with the request matches a SAI value associated with the storage location to be accessed). As such, storage 1632 may be secured to store sensitive content.

In an embodiment, appropriate clocking logic may be applied to the various core perimeter logics to enable the storages and logic therein to be accessed in particular low power states. In an embodiment, double clocking logic may be applied to the storages of the sustain power domains. As one example, a cache coherent fabric (CCF) clock may be provided to the storages for standard read/write operations. In turn, a CRi clock may be provided to the storages for save/restore operations.

Understand that a processor may include additional components and circuitry. In the illustration of FIG. 16, processor 1600 further includes a power delivery unit 1640, which in an embodiment may include one or more fully integrated voltage regulators, a clock circuit 1650, which in an embodiment may be implemented as a phase lock loop, and a digital thermal sensor 1660. As seen, each of these components may communicate with the other components of processor 1600 via interconnect 1675. Understand while shown with this particular processor implementation in FIG. 16, many variations and alternatives are possible.

Figure 17:
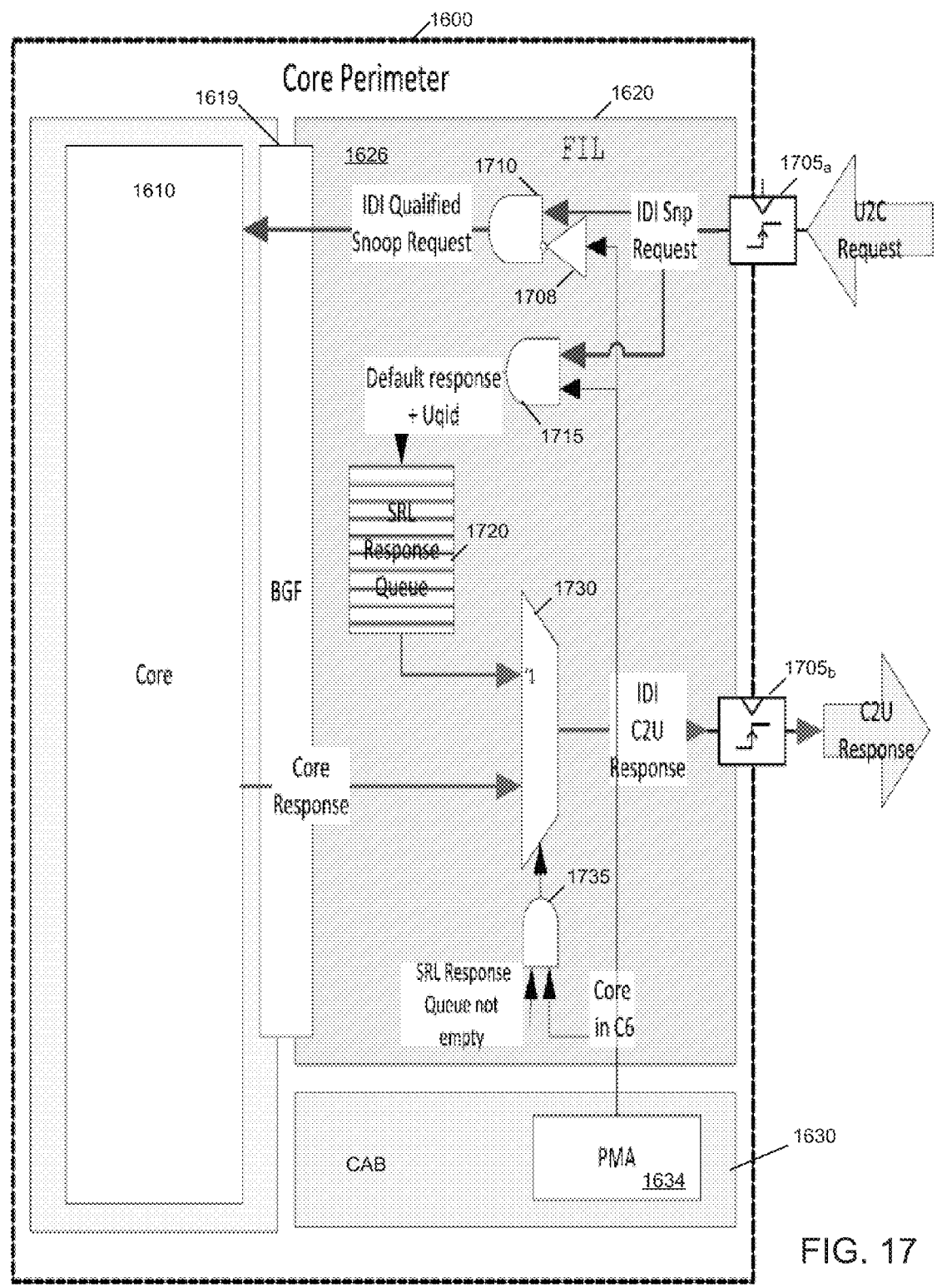
FIG. 17 is a block diagram of further details of a snoop response logic in accordance with an embodiment.

Referring now to FIG. 17, shown is a block diagram of further details of a snoop response logic in accordance with an embodiment. As shown in FIG. 17, processor 1600 may take the similar form as described above in FIG. 16. However, further details regarding snoop response logic 1626 are shown. As seen, this snoop response logic is located within FIL 1620, configured between a core 1610 and an uncore portion of the processor (not shown for ease of illustration in FIG. 17, but which may be connected to FIL 1620 via an inter-die interconnect). In the particular implementation shown, clock crossing buffers 1705*a* and 1705*b* provide interfaces for incoming uncore-to-core requests (U2C requests) and outgoing core-to-uncore responses (C2U responses).

For incoming snoop requests, received via the IDI, when core 1610 is in an active state, such requests pass through a logic gate 1710, implemented as an AND gate, as an IDI qualified snoop request to core 1610 (via BGF 1619). As such, depending upon the state of data associated with the request in core 1610 (e.g., present or not present and cache coherency state if present), a corresponding core response is provided via a multiplexer 1730 to the uncore via the C2U response channel.

However, in the situation where core 1610 is in a particular low power state (e.g., a C6 or deeper low power state) it is established that no data is present in a valid condition within the core and as such, a default snoop response can be provided. Still further, this response can be provided without causing core 1610 itself to wake from the given low power state.

Snoop response logic 1626 is configured to realize this operation responsive to a low power state signal received from PMA 1634 (Core in C6 signal). When this signal is active, inverter 1708 causes AND gate 1710 to not pass the snoop request to core 1610. Instead logic gate 1715 (implemented as another AND gate) is activated to be an active input into a SLR response queue 1720. More specifically, an entry may be populated for this received snoop request with a corresponding source identifier that identifies the source of the snoop request. When this entry passes through queue 1720, it is output to multiplexer 1730 as the default response (namely that the requested data is not present, such as by way of an invalidate snoop response). Multiplexer 1730 in turn may be controlled in this instance (via logic gate 1735, implemented as another AND gate) to thus pass this default response to the uncore. As such, the level of the Core in C6 status signal output by PMA 1634 controls the state of logic gates 1710, 1715, and 1735 to either cause a default snoop response when the core is in at least a threshold low power state or a core-controlled snoop response when the core is in an active state (or in a relatively shallow low power state). Understand while shown at this high level in the embodiment of FIG. 17, many variations and alternatives are possible.

Figure 18:
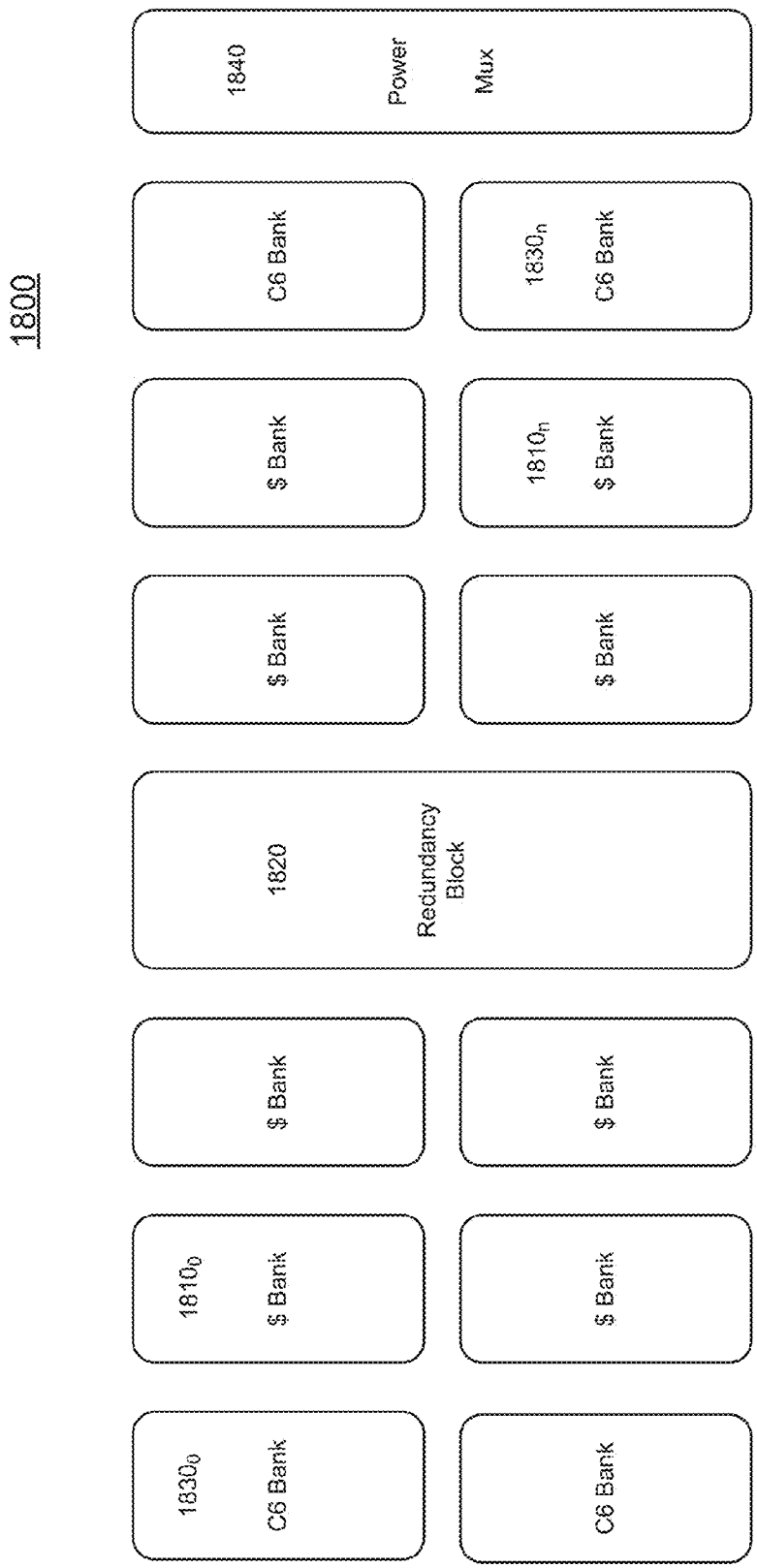
FIG. 18 is a high level block diagram of an internal processor memory in accordance with an embodiment.

Referring now to FIG. 18, shown is a high level block diagram of an internal processor memory in accordance with an embodiment. More specifically, FIG. 18 shows a block diagram of an SRAM 1800, which may be a multi-bank internal memory of a processor to enable local, fast access to data. As seen, a plurality of cache banks 1810$_0$-1810$_n$ are present. Understand while shown with eight such banks in the illustration, more or fewer banks may be present in a particular embodiment. Further, a redundancy block 1820 is provided for redundancy. Understand that in a low power mode, the information stored in cache banks 1810$_0$-1810$_n$ (and redundancy block 1820) may be flushed and these banks are not powered on during at least particular low power states.

However, embodiments provide additional retention banks 1830$_0$-1830$_m$. In various embodiments, banks 1830 may provide for storage of data persistently even when the given core is in a particular low power state, e.g., a C6 or even deeper low power state. In one such embodiment, retention banks 1830 may remain powered on to retain state information locally within the cache during a C6 state. Although the scope of the present invention is not limited in this regard, in some cases only certain context information associated with one or more threads executing on the core and core configuration information may be stored in retention banks 1830 prior to entry into a given low power state. By providing these retention banks within SRAM internal to a core, improved C6 save/restore latencies are realized. Also understand while shown with a particular topology where retention banks 1830 are physically located at an exterior of this memory, other locations are possible.

As further shown in FIG. 18, a power multiplexer 1840 may provide for selection of incoming voltages to the banks. For example, when in an active state, an active voltage level may be provided to all banks. Instead in a low power state, e.g., a C6 state, a retention voltage may be provided to retention banks 1830, while no voltage is provided to cache banks 1810.

By providing C6 SRAM storage internal to a core, during a restore operation, when state information stored in retention banks 1840 is restored to processor state, an MCA error may occur when an uncorrectable error occurs during read out. For example, assume an error correction code (ECC) memory in which it is determined that an uncorrectable error is present, e.g., due to multiple bit errors within a given memory block read. Such error may lead to an MCA error. However, during this restore operation, the processor is not yet configured for MCA operation, as various state information of the core stored in retention banks 1840 has yet to be restored to the configuration of the core. As such, prior to completion of reading out the state information stored in retention banks 1640, the core is not configured for proper MCA operation.

Accordingly, embodiments provide MCA report register 1627 (shown in FIG. 16). This register may log such MCA errors occurring during C6 restore operations. During the restore flow, microcode may restore MCA banks of an MCA logic (which implements a MCA architecture). These banks may be implemented as a set of registers per core subdomain. During this restore operation, the MCA data is overwritten. Thus to enable correct identification of the error and triggering of a MCA error, the MCA logic may read the report register to determine presence of one or more MCA errors and take appropriate action, such as raising a MCA error, causing a processor reset or other operation to resolve the error. Understand while shown at this high level in the embodiment of FIG. 18, many variations and alternatives are possible.

As described above, a processor may have a plurality of domains, each domain to operate at a given clock frequency. For example, a write domain (e.g., uncore of a processor) may run at a write clock frequency and a read domain (e.g., core of the processor) may operate at a read clock frequency. In some situations, one or the other domain may be controlled to be in a different power state than the other domain. For example, a core domain may be placed in a low power state while the uncore domain remains active. Or, an operating system may decide to shut down one domain temporarily to change a clock frequency of the domain, e.g., in order to save power, while another domain of the processor remains active. The read domain may shut down in order to have its clock frequency adjusted, while the write domain remains active. For example, the read domain may be shut down in order to transition into a state of reduced activity (e.g., slower clock frequency) and reduced power consumption, e.g., one of several P-states of reduced activity.

According to embodiments, a back pressure scheme may be implemented between the write domain and the read domain of the processor. The back pressure scheme can enable writes to a buffer (e.g., payload bubble generator first in first out buffer (payload BGF)) within the write domain during a time period when the read domain is shut down. During shut down of the read domain, no packets stored in the payload BGF are read by the read domain. Upon restart of the read domain, packets that are stored in the payload BGF of the write domain can be read by the read domain.

The back pressure mechanism includes write source credit logic in the writer domain to maintain a count of write credits. Initially, a fixed number of write credits is supplied to the writer source credit logic from a BGF credit logic (BGF credit counter), e.g., within the read domain. Each write credit enables a write source to write a data packet to the payload BGF, regardless of whether the read domain is active or shut down. Upon each write to the payload BGF, a write source credit counter in the write source credit logic is decremented. If the write source credit counter indicates that no write credits are available in the write domain, writes to the payload BGF are prohibited. With each read of the payload BGF, an additional write credit is supplied to the write source credit logic by the BGF credit logic. Use of write credits prevents overwriting of stored packets within the payload BGF.

In the discussion that follows, a value of "true" is represented by a numerical value of '1', and a value of "false" is represented by a numerical value of '0'. In other embodiments, "true" may be represented by '0' and "false" may be represented by '1' with no loss of generality regarding the concepts presented.

Each domain may have an associated bubble generator (BG) that generates a gating signal. That is, a write BG in the write domain generates a write signal (time slot valid write (TSVW)) that gates a write to the payload BGF) for each instance that the write clock has a value of '1'. When both the write BG and the write clock have a value of '1' and when the write source has a packet to write to the payload BGF, the write can occur. When either the write BG or the write clock has a value of '0' no write will occur to the payload BGF. In embodiments, the write to the payload BGF is further gated by write source credits, e.g., if no write source credits are available in the write domain (as determined by the write source credit logic) no write will occur. If write source credits are available, upon the execution of the write to the payload BGF the count of source credits decrements by one.

The read domain has a read BG that gates each read, in combination with a read clock. That is, the read BG in the read domain generates a read signal (time slot valid read (TSVR)) that gates whether a read (e.g., from the payload BGF) is enabled for each instance that the read clock has a value of '1' (e.g., "true"). When the read BG outputs a '1' and the read clock outputs a '1', the read of the payload BGF is enabled (e.g., read is permitted during a "read window"). If either the read BG or the read clock has a value of '0', no read will occur. In some embodiments, a system of read credits may be employed to further gate whether reads of the payload BGF are enabled, e.g., if at least one read credit is available, a read of the payload BGF is permitted. Read credits may be issued by reader credits issuance logic within the read domain, and a count of read credits may be maintained by an egress (reader) credit counter in the read domain. The read BG has a read BG frequency (TSVR frequency) and the write BG has a write BG frequency (TSVW frequency). In embodiments, the read BG frequency and the write BG frequency are set such that, for each base clock cycle, there will be an equal number of write opportunities and read opportunities so as to maintain a steady state flow of packets from write domain to the read domain. In embodiments, the relationship between the read BG and the write BG is as follows: The domain with the slower domain clock frequency may be set to have a BG value (time slot valid (TSV)) of '1' (e.g., always 'true'), while for the domain with the faster domain clock frequency, the BG frequency is set to be proportional to a ratio of the domain frequencies, e.g., faster domain frequency/slower domain frequency. This proportionality scheme enables an equal number of read opportunities ("read windows") and write opportunities ("write windows") for each base clock cycle.

Additionally, in embodiments, the write domain has a valid BG FIFO buffer (valid BGF) that includes a valid FIFO buffer ("valid FIFO" herein) to store a value ("valid indicator") for each write domain clock cycle when the write BG has a value of '1'. For a given write domain clock cycle, if the write source writes a packet to the payload BGF, the valid indicator has a value of '1' and is stored in the valid FIFO. If the write source does not write a packet to the payload BGF, the valid indicator has a value of '0' and is stored in the valid FIFO. When the write BG has a value of '0' no values are stored in the valid FIFO.

In embodiments, during a shutdown of the read domain, both the read BG and the write BG are shut down, e.g., TSVW and TSVR maintain a constant value of '0.' Thus, no reads of the payload BGF are possible. Although no writes are done to the valid FIFO, the write source can continue to write packets to the payload BGF. While the write BG is shut down a write accumulator in the valid BGF stores (e.g., accumulates) a valid indicator for each write to the payload BGF (e.g., each valid indicator has a value of '1').

The TSVs are stopped by resetting the BGs. After the P-state transition ends and a new clock frequency is established in one (or both) of the read and write sides, TSVR and TSVW can be restarted. The valid BGF and the payload BGF will start to operate from the same corresponding locations as indicated by their corresponding pointers prior to the P-state transition shut-down.

Figure 19:
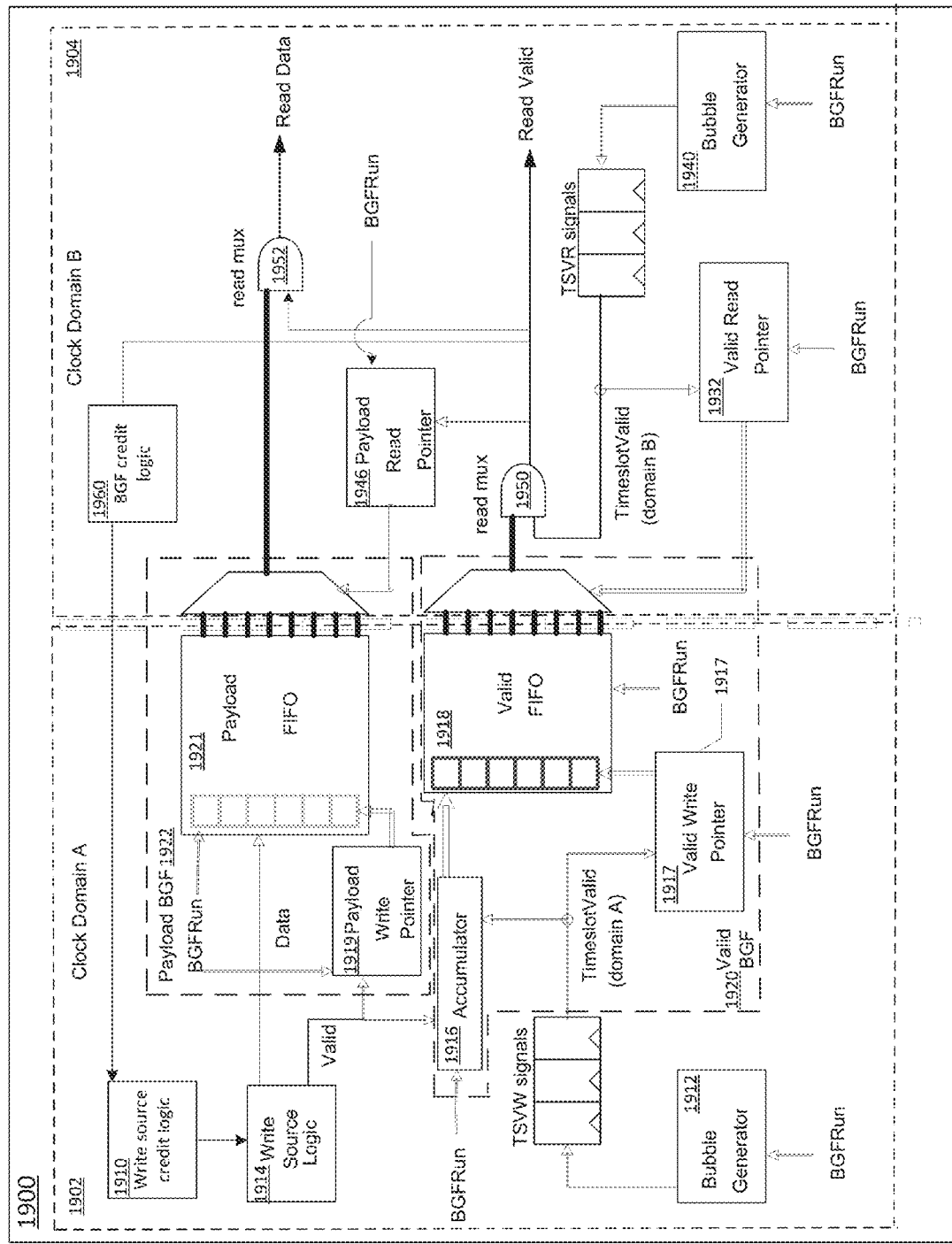
FIG. 19 is a block diagram of a processor in accordance with an embodiment of the present invention.

FIG. 19 is a block diagram of a processor 1900, according to embodiments of the present invention. Processor 1900 includes a clock domain A 1902 that operates at a clock frequency A and a clock domain B 1904 that operates at a clock frequency B. Clock domain A 1902 includes a bubble generator (BG) 1912, write source credit logic 1910, write source logic 1914, a payload bubble generator first in first out buffer (payload BGF) 1922 that includes a payload write pointer 1919 and a payload first in first out buffer (payload FIFO) 1921, and a valid BGF 1920 that includes a valid write pointer 1917 and a valid FIFO 1918. Clock domain B 1904 includes a bubble generator (BG) 1940, a valid read pointer 1932, a payload read pointer 1946, read mux 1950, read mux 1952, and BGF credit logic 1960. Processor 1900 also includes one or more cores (not shown), a power control unit (not shown), and may include other hardware, software, and/or firmware logic (not shown), caches, etc.

In operation, a BGF run signal received from, e.g., a PCU (not shown) starts bubble generator (BG) 1912 and BG 1940. The write domain clock enables, for each 'true' value of the write clock, write logic 1914 to write a data packet (if there is a data packet to be written) to the payload FIFO 1921 at a location indicated by a payload write pointer 1919 that increments its pointer address with each write.

The write bubble generator 1912 is to provide time slot valid write (TSVW) signals. A write window occurs when both the TSVW signal and the write clock are 'true', e.g., each has a value of '1'. When each write window occurs, the write source logic 1914 sends a corresponding valid indicator to the valid BGF 1920. Each valid indicator has a value to indicate whether a data packet is to be written to the payload FIFO 1921, e.g., the valid indicator has a value of '1' to indicate that a data packet is being written to the payload FIFO 1921 during the write window, or a value of '0' to indicate that no data packet is being written to the payload FIFO 1921 during the write window. If the write bubble generator 1912 is shut down (e.g., during shutdown of the clock domain B 1904), the write logic 1914 can still write data packets to the payload FIFO (each write gated by the write clock), and an indication of each data packet that is written to the payload FIFO may be stored in an accumulator 1916.

Bubble generator 1912 and bubble generator 1940 are configured to produce time slot valid signals (TSVW and TSVR, respectively), and they can be configured to gate activity in their respective domains, so that writes and reads occur at an equal rate for each base clock cycle. For instance, in an embodiment, the clock domain A 1902 operates at a clock frequency A that is faster than the clock frequency B of clock domain B 1904. The clock domain B, having the slower clock frequency, can be configured to produce a TSV signal that is enabled constantly (value of '1'), so that the clock frequency B gates performance of actions (e.g., reads of the payload FIFO 1921) in the domain B. The clock domain A (with the faster clock frequency) produces TSV signals that gate actions and, coupled with the clock frequency A, enable actions to be performed at a same rate that as the domain clock frequency B.

As an example, the processor has a base clock frequency of 100 MHz, the clock domain B has a clock frequency B of 300 MHz, and the clock domain A has a clock frequency A of 500 MHz. In one base clock cycle, clock domain B has 3 clock cycles and clock domain A has 5 clock cycles. Bubble generator 1940 may produce a constant signal so that each of the 3 clock cycles gate actions within the clock domain B during one base clock cycle. Bubble generator 1912 may produce TSVWs that, in combination with the 5 clock cycles of clock frequency A, also gate 3 clock cycles in clock domain A (e.g., TSVW has a 'false' value during two of the five frequency A clock cycles and a 'true' value during three of the five frequency A clock cycles within one base clock cycle). By selection of an appropriate bubble generator frequency of the domain with the higher clock domain frequency, both domains can be made to execute reads/writes at the same rate within each base clock cycle.

In embodiments, when bubble generator 1912 is operational, the valid write pointer 1917 and the valid read pointer 1932 are to commence with a pointer separation N that is to remain constant, e.g., to prevent both read-after-write instability and write-after-read instability. The valid write pointer 1917 points to a current location within the valid FIFO 1918, the current location that is to store a valid indicator that indicates whether a corresponding location within the payload FIFO 1921 stores a data packet. The value of the valid indicator written is '1' when a data packet is to be stored in a sequentially next location in the payload FIFO 1921. The value of the valid indictor written is '0' when no data packet is to be written to the payload FIFO 1921 during the current write window. For example, when a write of the data packet to the payload FIFO 1921 is to occur, the valid indicator has a value of '1' and is written to corresponding to the current location in the payload FIFO 1921 that is to store the data packet. The valid write pointer 1917 is advanced upon each write window. The payload write pointer 1919 is advanced responsive to an indication that a write to the payload FIFO 1921 is to occur. The valid write pointer 1917 and the valid read pointer 1932 maintain pointer separation between writes and reads of the payload FIFO 1921.

Write source credit logic 1910 stores write credits and/or maintains a count of write credits received. For each write by the write source logic 1914 to the payload 1921, a write credit is used and the count of write credits is decremented.

The valid BGF 1920 includes an accumulator 1916 that inputs to the valid FIFO 1918 and enables valid indicator values (e.g., '1's) to be written to the valid BGF 1920 faster than the TSVW cycles occur. For example, if the write logic 1914 writes in a write clock cycle (e.g., of clock domain A) when TSVW is not true, the accumulator 1916 is incremented, but no write to the valid FIFO 1918 occurs.

When a TSVW signal is true (value of '1'), if no data packet is to be written to the payload FIFO 1921 and if the accumulator is non-zero, a '1' will be written into the sequentially next location in the valid FIFO 1918 and the accumulator will be decremented (e.g., the '1' is transferred from the accumulator to the valid FIFO 1918). If a TSVW true cycle occurs and if there is no write of a data packet to the payload FIFO 1921 from write logic 1914, and no previously accumulated writes (e.g., the accumulator has all zeros, and so there are no stored packets in payload FIFO 1921), a 0 is written to valid FIFO 1918.

In embodiments, write logic 1914 is to be halted if all write credits have been depleted. An initial allotment of write credits may be equal to a capacity of the payload FIFO 1921 (and equal to a capacity of valid FIFO 1918). Accumulator 1918 may be sized according to a size of valid FIFO 1918. For example, in one embodiment accumulator 1916 may be equal in capacity to valid FIFO 1918. (Additionally, the accumulator is not to decrement below zero.)

Reading of valid FIFO 1918 may be done in each read clock cycle of read clock domain 1904 in which bubble generator 1940 signals a time slot valid read (TSVR). The valid read pointer 1932 moves after each read. As '1's exit valid FIFO 1918 and enter read mux 1950, the '1's may enable read of data packets from payload FIFO 1921 (as indicated by payload read pointer 1946), via read mux 1952, and/or may increment a counter (not shown), e.g., when read credits are implemented and reads are delayed (read credits are discussed below). Each instance of a read of payload FIFO 1921 occurs when the valid indicator read from valid FIFO 1918 is '1' and is input to read mux 1950 with a second input (TSVR signal). In embodiments, when both inputs of read mux 1950 are true, the read of payload FIFO 1921 occurs via read mux 1952, and BGF credit logic 1960 issues a write credit to write source credit logic 1910, which enables another write to occur at a future write window.

Valid read pointer 1932 is initialized to be "N" less than valid write pointer 1917, where N is the pointer separation. In some embodiments, a size of valid FIFO 1918 is at least twice the separation between valid read pointer 1932 and valid write pointer 1917, to allow for skew in both directions, e.g., to prevent read after write instability, and write-after-read instability. Valid read pointer 1932 and valid write pointer 1917 move continuously, so there is typically no overlap. Instability is typically avoided by virtue of the fact that the pointers are always separated. A time delay between writing to any given valid FIFO location and reading the valid FIFO location is governed by the pointer separation. When valid FIFO 1918 is stopped (BGFRun signal is lowered), valid write pointer 1917 is typically reset to point to a first entry and valid FIFO slave latches are reset.

Physically, a payload FIFO such as payload FIFO 1921 may be similar to a valid FIFO. The main difference is in how the write and read pointers operate, e.g., both the write pointer and the read pointer of a payload FIFO start at 0. In embodiments, writes to the payload FIFO only occur when there is a packet to be written and when there are payload credits available. Unlike the valid FIFO, where the valid write pointer increments every time there is a write window, in the case of the payload FIFO the write pointer increments only when a data packet is written to the payload FIFO. Reads of the payload FIFO occur when the output of the valid FIFO indicates that there is valid data in the payload FIFO. Pairing the payload FIFO with the valid FIFO ensures that the write pointer is ahead of the read pointer before the read occurs, preventing metastability and allowing for clock skew.

In embodiments, the valid FIFO/payload FIFO combination operates such that writes are made only when payload credits are available; writes are to the next payload FIFO location, and the write pointer is incremented; when the writer source has a packet, a '1' is sent into the valid FIFO, which will cause the packet to be written into the payload FIFO in the next write window; and on the reader side, when the output of the valid FIFO is a '1', data in the payload FIFO is available to be read.

In various embodiments, the back pressure mechanism (e.g., use of write credits) enables the writer side to write packets to the payload FIFO only when the writer side has credits. The writer side will receive a credit only if there is an empty location in the payload FIFO. Each time the reader side reads from the payload FIFO a location in the payload FIFO is vacated, and the reader side will send a credit to the writer side.

Figure 20:
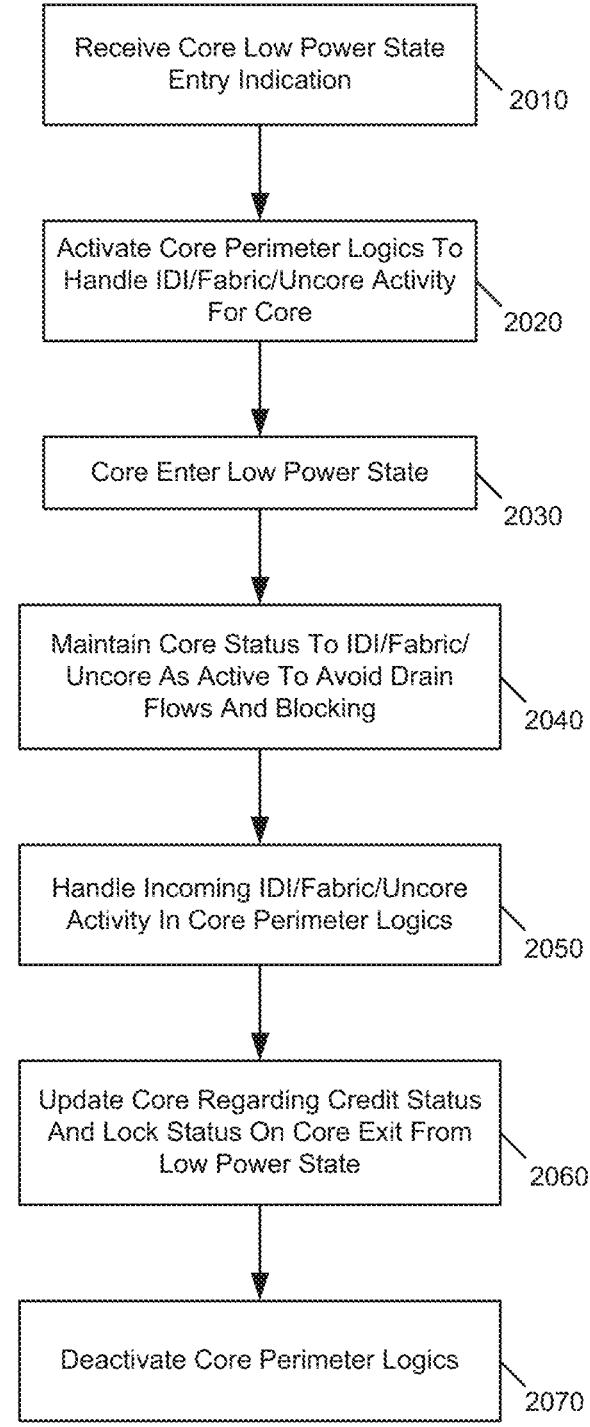
FIG. 20 is a flow diagram of a power control method in accordance with an embodiment.

Referring now to FIG. 20, shown is a flow diagram of a power control method in accordance with an embodiment. More specifically, method 2000 shown in FIG. 20 is used to enable a core that has its power state hidden from a remainder of a processor or other SoC to enter into and exit from certain low power states in a manner that is transparent to the remainder of the processor. In this way, other processor components can continue to operate normally, including sending events and other signals and receiving expected signals from the core during such low power state.

As shown, method 2000 begins by receiving a core low power state entry indication (block 2010). This low power state entry indication may be received by core perimeter logic associated with the core, e.g., from a power controller, when the core is to enter into a low power state. Next at block 2020, one or more core perimeter logics may be activated to handle certain activity for the core. More specifically, this activity may be any activity associated with the IDI/fabric/uncore, such as the various snoop, credit and lock operations described above. Such logic activation may be responsive to a low power state signal, e.g., received from a PMA. Thereafter at block 2030, the core may enter into an appropriate low power state. For purposes of discussion, assume that this low power state is the C6 low power state. In this instance, core cache memories are flushed and context information of the core may be stored into C6 SRAM within the core, which remains powered by a retention voltage in this low power state.

Still with reference to FIG. 20, at block 2040 the core status is maintained as active, although the core is in a low power state. Note that different manners of maintaining the status as active are possible in different embodiments. By maintaining the low power state entry hidden from processor agents, various drain flows associated with a low power state entry for fabric interfaces, fabrics and other components can be avoided. Still further, blocking operations also may be avoided.

Still with reference to FIG. 20 at block 2050 any incoming activity to the core perimeter logic may be handled by constituent logic of the core perimeter logic while the core is in the low power state. Such activity may include various IDI/fabric/uncore activity, including incoming snoops, lock messages, credit messages, events and so forth.

Assume now that the core exits the low power state into an active state and informs the core perimeter logic of this exit. Control then passes to block 2060 where the core can be updated with various status information, including credit status information and lock status information. Of course additional status information may be communicated to the core in different embodiments. Thereafter, control passes to block 2070 where various core perimeter logics may be deactivated such that incoming events, signals, requests and so forth may be provided to be directly handled by the core, rather than constituent logics of the core perimeter logic. Understand while shown at this high level in the embodiment of FIG. 20, many variations and alternatives are possible.

The following examples pertain to further embodiments.

In one example, a processor comprises a core to execute instructions and a core perimeter logic coupled to the core that includes a fabric interface logic having a first storage to store state information of the core when the core is in a low power state. The core perimeter logic is to enable an inter-die interconnect coupled between the core and an uncore to be maintained in an active state during entry of the core into a low power state.

In an example, the fabric interface logic includes a snoop logic to receive a snoop request from a requester when the core is in the low power state and send a snoop response to the requester, where the core is to remain in the low power state.

In an example, the snoop response comprises a default snoop response to indicate that the core does not include data associated with the snoop request.

In an example, the snoop logic is to provide the snoop request to the core when the core is in an active state, and to send the default snoop response to the requester when the core is in the low power state.

In an example, the core perimeter logic is to enable a power state of the core to be transparent to the uncore, to enable the uncore to maintain a plurality of pending transactions during an entry flow of the core into the low power state, without draining the plurality of pending transactions.

In an example, the fabric interface logic further comprises a credit logic to maintain a plurality of credit values when the core is in the low power state.

In an example, the credit logic is further to update one or more of the plurality of credit values when the core is in the low power state.

In an example, the core perimeter logic further comprises a sideband event logic to receive and store one or more sideband events received via a sideband interconnect coupled to the core perimeter logic, the sideband event logic to inform a power controller regarding receipt of the one or more sideband events, to enable the power controller to determine whether to cause the core to exit the low power state to handle at least one of the one or more sideband events.

In an example, the fabric interface logic further comprises a lock response logic to receive a lock quiesce message for an atomic operation, and when the core is in the low power state to send a default response message to the uncore.

In an example, the lock response logic is to inform the core of the atomic operation when the core exits the low power state before the atomic operation is completed, to prevent the core from sending one or more transactions during the atomic operation.

In an example, the core further comprises a report register to store error information associated with occurrence of an uncorrectable error during a restore of state information from a retention portion of a memory of the core after the core exits the low power state.

In an example, the core is to execute microcode to write the error information from the report register to a machine check architecture storage, to enable a machine check architecture error to be raised.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: enabling one or more logic units of a core perimeter logic coupled to a core of a multicore processor to handle incoming activity to the core, responsive to an indication that the core is to enter into a first low power state; and maintaining a status of the core as active when the core is in the first low power state, to indicate to a fabric and one or more IP logics of the processor that the core is in an active state, to enable the first low power state of the core to be hidden from the fabric and the one or more IP logics.

In an example, the method further comprises handling incoming activity directed to the core from one or more of the fabric and the one or more IP logics in the one or more logic units of the core perimeter logic, when the core is in the first low power state.

In an example, the method further comprises updating status information regarding one or more of a credit status and a processor lock status when the core exits from the first low power state, based at least in part on status information stored in at least one of the one or more logic units of the core perimeter logic.

In an example, the method further comprises: receiving a snoop request from a requester in a first logic unit of the core perimeter logic when the core is in the first low power state; and sending a snoop response to the requester from the first logic unit, the snoop response comprising a default snoop response to indicate that the core does not include data associated with the snoop request.

In an example, the method further comprises: receiving a lock quiesce message for an atomic operation in a second logic unit of the core perimeter logic when the core is in the first low power state; sending a default response message via the fabric to acknowledge the lock quiesce message; and informing the core of the atomic operation when the core exits the first low power state before the atomic operation is completed.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a multicore processor including a plurality of cores, an uncore, a fabric, and an inter-die interconnect to couple the plurality of cores and the fabric, where the inter-die interconnect is to remain active when one or more of the plurality of cores are in a low power state, a status of the one or more cores in the low power state to be hidden from the inter-die interconnect and the fabric, to enable a plurality of transactions to be maintained in the fabric during an entry flow into the low power state and an exit flow from the low power state. The system may further include a system memory coupled to the multicore processor.

In an example, the uncore comprises: a payload clock crossing logic to store data packets for transmission to a first core; and a write credit logic to maintain a count of write credits, where when the first core is in the low power state, the payload clock crossing logic is to store a new data packet responsive to the count of write credits being above a first value.

In an example, the write credit logic is to update the count of write credits responsive to the data packet being written to the payload clock crossing logic.

In an example, a write source is to be prevented from writing a second packet to the payload clock crossing logic if the count of write credits is less than the first value.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core to execute instructions; and
   a core perimeter logic coupled to the core, the core perimeter logic including a fabric interface logic including a first storage to store state information of the core when the core is in a low power state, wherein the core perimeter logic is to enable an intra-die interconnect coupled between the core and an uncore of the processor to be maintained in an active state during entry of the core into a low power state.

2. The processor of claim 1, wherein the fabric interface logic includes a snoop logic to receive a snoop request from a requester when the core is in the low power state and send a snoop response to the requester, wherein the core is to remain in the low power state.

3. The processor of claim 2, wherein the snoop response comprises a default snoop response to indicate that the core does not include data associated with the snoop request.

4. The processor of claim 3, wherein the snoop logic is to provide the snoop request to the core when the core is in an active state, and to send the default snoop response to the requester when the core is in the low power state.

5. The processor of claim 1, wherein the core perimeter logic is to enable a power state of the core to be transparent to the uncore, to enable the uncore to maintain a plurality of pending transactions during an entry flow of the core into the low power state, without draining the plurality of pending transactions.

6. The processor of claim 1, wherein the fabric interface logic further comprises a credit logic to maintain a plurality of credit values when the core is in the low power state.

7. The processor of claim 6, wherein the credit logic is further to update one or more of the plurality of credit values when the core is in the low power state.

8. The processor of claim 7, wherein the core perimeter logic further comprises a sideband event logic to receive and store one or more sideband events received via a sideband interconnect coupled to the core perimeter logic, the sideband event logic to inform a power controller regarding receipt of the one or more sideband events, to enable the power controller to determine whether to cause the core to exit the low power state to handle at least one of the one or more sideband events.

9. The processor of claim 1, wherein the fabric interface logic further comprises a lock response logic to receive a lock quiesce message for an atomic operation, and when the core is in the low power state to send a default response message to the uncore.

10. The processor of claim 9, wherein the lock response logic is to inform the core of the atomic operation when the core exits the low power state before the atomic operation is completed, to prevent the core from sending one or more transactions during the atomic operation.

11. The processor of claim 1, wherein the core further comprises a report register to store error information associated with occurrence of an uncorrectable error during a restore of state information from a retention portion of a memory of the core after the core exits the low power state.

12. The processor of claim 11, wherein the core is to execute microcode to write the error information from the report register to a machine check architecture storage, to enable a machine check architecture error to be raised.

13. A non-transitory machine-readable medium having stored thereon data, which if used by at least one machine, causes the at least one machine to fabricate at least one integrated circuit to perform a method comprising:

enabling one or more logic units of a core perimeter logic of a multicore processor coupled to a core of the multicore processor to handle incoming activity to the core, responsive to an indication that the core is to enter into a first low power state; and maintaining a status of the core as active when the core is in the first low power state, to indicate to a fabric and one or more intellectual property (IP) logics of the multicore processor that the core is in an active state, to enable the first low power state of the core to be hidden from the fabric and the one or more IP logics.

14. The non-transitory machine-readable medium of claim 13, wherein the method further comprises handling incoming activity directed to the core from one or more of the fabric and the one or more IP logics in the one or more logic units of the core perimeter logic, when the core is in the first low power state.

15. The non-transitory machine-readable medium of claim 14, wherein the method further comprises updating status information regarding one or more of a credit status and a processor lock status when the core exits from the first low power state, based at least in part on status information stored in at least one of the one or more logic units of the core perimeter logic.

16. The non-transitory machine-readable medium of claim 13, wherein the method further comprises:
   receiving a snoop request from a requester in a first logic unit of the core perimeter logic when the core is in the first low power state; and
   sending a snoop response to the requester from the first logic unit, the snoop response comprising a default snoop response to indicate that the core does not include data associated with the snoop request.

17. The non-transitory machine-readable medium of claim 13, wherein the method further comprises:
   receiving a lock quiesce message for an atomic operation in a second logic unit of the core perimeter logic when the core is in the first low power state;
   sending a default response message via the fabric to acknowledge the lock quiesce message; and
   informing the core of the atomic operation when the core exits the first low power state before the atomic operation is completed.

18. A system comprising:
   a multicore processor including a plurality of cores, an uncore, a fabric, and an intra-die interconnect to couple the plurality of cores and the fabric, wherein the intra-die interconnect is to remain active when one or more of the plurality of cores are in a low power state, a status of the one or more cores in the low power state to be hidden from the intra-die interconnect and the fabric, to enable a plurality of transactions to be maintained in the fabric during an entry flow into the low power state and an exit flow from the low power state; and
   a system memory coupled to the multicore processor.

19. The system of claim 18, wherein the uncore comprises:
   a payload clock crossing logic to store data packets for transmission to a first core; and
   a write credit logic to maintain a count of write credits, wherein when the first core is in the low power state, the payload clock crossing logic is to store a new data packet responsive to the count of write credits being above a first value.

20. The system of claim 19, wherein the write credit logic is to update the count of write credits responsive to the data packet being written to the payload clock crossing logic.

21. The system of claim 20, wherein a write source is to be prevented from writing a second packet to the payload clock crossing logic if the count of write credits is less than the first value.

* * * * *